(12) United States Patent
Pelletier et al.

(10) Patent No.: US 10,623,160 B2
(45) Date of Patent: Apr. 14, 2020

(54) REFERENCE SIGNAL COMMUNICATION IN A WIRELESS NETWORK

(71) Applicant: InterDigital Patent Holdings, Inc., Wilmington, DE (US)

(72) Inventors: Benoit Pelletier, Montreal (CA); Lujing Cai, Morganville, NJ (US); Diana Pani, Montreal (CA); Hong O. Zhang, Manalapan, NJ (US); Damian C. Hamme, Wilmington, DE (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 15/431,305

(22) Filed: Feb. 13, 2017

(65) Prior Publication Data

US 2017/0155487 A1 Jun. 1, 2017

Related U.S. Application Data

(63) Continuation of application No. 13/572,040, filed on Aug. 10, 2012, now abandoned.

(60) Provisional application No. 61/522,842, filed on Aug. 12, 2011, provisional application No. 61/541,714, filed on Sep. 30, 2011, provisional application No. 61/555,840, filed on Nov. 4, 2011, provisional application No. 61/591,577, filed on Jan. 27, 2012.

(51) Int. Cl.
*H04L 5/00* (2006.01)
*H04W 72/04* (2009.01)

(52) U.S. Cl.
CPC .......... *H04L 5/0051* (2013.01); *H04L 5/0023* (2013.01); *H04L 5/0035* (2013.01); *H04L 5/0053* (2013.01); *H04L 5/0091* (2013.01); *H04W 72/042* (2013.01)

(58) Field of Classification Search
None
See application file for complete search history.

(56) References Cited

U.S. PATENT DOCUMENTS

| 8,127,194 B2 | 2/2012 | Tseng |
| 8,433,252 B2 | 4/2013 | Nibe |
| 8,693,522 B2 | 4/2014 | Ma et al. |
| 8,824,398 B2 | 9/2014 | Jia et al. |
| 9,008,726 B2 | 4/2015 | Aminaka et al. |

(Continued)

FOREIGN PATENT DOCUMENTS

| CN | 101877859 A | 11/2010 |
| CN | 101931447 A | 12/2010 |

(Continued)

OTHER PUBLICATIONS

Ericsson et al., "Introduction of 8C-HSDPA," 3GPP TSG-RAN WG1 Meeting #65, R1-111757, Barcelona, Spain (May 9-13, 2011).

(Continued)

*Primary Examiner* — Adnan Baig
(74) *Attorney, Agent, or Firm* — Volpe and Koenig, P.C.

(57) ABSTRACT

A wireless transmit/receive unit (WTRU) may receive a radio resource control (RRC) message providing configuration information for a physical control channel. The WTRU may monitor the physical control channel using a pilot signal of the physical control channel. The pilot signal may be derived from the pilot sequence and an index of the physical control channel.

10 Claims, 18 Drawing Sheets

(56) References Cited

U.S. PATENT DOCUMENTS

| | | | |
|---|---|---|---|
| 2006/0281414 | A1 | 12/2006 | Lindoff et al. |
| 2007/0104150 | A1 | 5/2007 | Fernandez-Corbaton et al. |
| 2007/0195809 | A1* | 8/2007 | Blanz .................. H04L 1/0025 370/426 |
| 2008/0212702 | A1 | 9/2008 | Pan et al. |
| 2008/0313519 | A1* | 12/2008 | Tseng .................. H04L 1/0079 714/748 |
| 2009/0323840 | A1 | 12/2009 | Lee et al. |
| 2010/0034186 | A1 | 2/2010 | Zhou et al. |
| 2010/0142456 | A1* | 6/2010 | Lee .................. H04W 52/0216 370/329 |
| 2010/0323739 | A1* | 12/2010 | Wan .................. H04L 1/0026 455/513 |
| 2011/0096755 | A1 | 4/2011 | Clerckx et al. |
| 2011/0255620 | A1* | 10/2011 | Jones, IV ............. H04L 5/0046 375/260 |
| 2013/0336157 | A1 | 12/2013 | Tidestav |

FOREIGN PATENT DOCUMENTS

| | | |
|---|---|---|
| CN | 102014509 A | 4/2011 |
| CN | 102036397 A | 4/2011 |
| EP | 2 056 538 | 5/2009 |
| WO | 2010/051511 A2 | 5/2010 |
| WO | 2010/059926 | 5/2010 |

OTHER PUBLICATIONS

Ericsson, "4-Branch MIMO for HSDPA," 3GPP TSG RAN WG1 Meeting #65, R1-111763, Barcelona, Spain (May 9-13, 2011).

Huawei et al., "Pilot design for DL 4-branch MIMO," 3GPP TSG-RAN WG1 Meeting #66bis, R1-112978, Zhuhai, China (Oct. 10-14, 2011).

InterDigital Communications, LLC, "Pilot design for four branch MIMO transmission for HSDPA," 3GPP TSG-RAN WG1 Meeting #67, R1-114172, San Francisco, CA, USA (Nov. 14-19, 2011).

Nokia Siemens Networks, "Proposed Study Item on HSDPA Multipoint Transmission," 3GPP TSG RAN Meeting #50, RP-101439, Istanbul, Turkey (Dec. 7-10, 2010).

Third Generation Partnership Project, "Technical Specification Group Radio Access Network; Radio Resource Control (RRC); Protocol Specification (Release 1999)," 3GPP TS 25.331 v3.21.0, Dec. 2004.

Third Generation Partnership Project, "Technical Specification Group Radio Access Network; Radio Resource Control (RRC); Protocol Specification (Release 4)," 3GPP TS 25.331 v4.20.0, Dec. 2008.

Third Generation Partnership Project, "Technical Specification Group Radio Access Network; Radio Resource Control (RRC); Protocol Specification (Release 4)," 3GPP TS 25.331 v4.21.0, Jan. 2012.

Third Generation Partnership Project, "Technical Specification Group Radio Access Network; Radio Resource Control (RRC); Protocol Specification (Release 5)," 3GPP TS 25.331 v5.24.0, Jun. 209.

Third Generation Partnership Project, "Technical Specification Group Radio Access Network; Radio Resource Control (RRC); Protocol Specification (Release 5)," 3GPP TS 25.331 v5.25.0, Jan. 2012.

Third Generation Partnership Project, "Technical Specification Group Radio Access Network; Radio Resource Control (RRC); Protocol Specification (Release 6)," 3GPP TS 25.331 v6.25.0, Apr. 2010.

Third Generation Partnership Project, "Technical Specification Group Radio Access Network; Radio Resource Control (RRC); Protocol Specification (Release 6)," 3GPP TS 25.331 v6.26.0, Jan. 2012.

Third Generation Partnership Project, "Technical Specification Group Radio Access Network; Radio Resource Control (RRC); Protocol Specification (Release 7)," 3GPP TS 25.331 v7.20.0, Jun. 2011.

Third Generation Partnership Project, "Technical Specification Group Radio Access Network; Radio Resource Control (RRC); Protocol Specification (Release 7)," 3GPP TS 25.331 v7.22.0, Mar. 2012.

Third Generation Partnership Project, "Technical Specification Group Radio Access Network; Radio Resource Control (RRC); Protocol Specification (Release 8)," 3GPP TS 25.331 v8.15.0, Jun. 2011.

Third Generation Partnership Project, "Technical Specification Group Radio Access Network; Radio Resource Control (RRC); Protocol Specification (Release 8)," 3GPP TS 25.331 v8.19.0, Jul. 2012.

Third Generation Partnership Project, "Technical Specification Group Radio Access Network; Radio Resource Control (RRC); Protocol Specification (Release 9)," 3GPP TS 25.331 v9.7.0, Jul. 2011.

Third Generation Partnership Project, "Technical Specification Group Radio Access Network; Radio Resource Control (RRC); Protocol Specification (Release 9)," 3GPP TS 25.331 v9.11.0, Jul. 2012.

Third Generation Partnership Project, "Technical Specification Group Radio Access Network; Radio Resource Control (RRC); Protocol Specification (Release 10)," 3GPP TS 25.331 v10.4.0, Jul. 2011.

Third Generation Partnership Project, "Technical Specification Group Radio Access Network; Radio Resource Control (RRC); Protocol Specification (Release 10)," 3GPP TS 25.331 v10.8.0, Jul. 2012.

Third Generation Partnership Project, "Technical Specification Group Radio Access Network; Radio Resource Control (RRC); Protocol Specification (Release 11)," 3GPP TS 25.331 v11.2.0, Jul. 2012.

Third Generation Partnership Project, "Technical Specification Group Radio Access Network; Spreading and Modulation (FDD) (Release 1999)," 3GPP TS 25.213 v3.9.0, Jan. 2004.

Third Generation Partnership Project, "Technical Specification Group Radio Access Network; Spreading and Modulation (FDD) (Release 4)," 3GPP TS 25.213 v4.5.0, Jan. 2004.

Third Generation Partnership Project, "Technical Specification Group Radio Access Network; Spreading and Modulation (FDD) (Release 5)," 3GPP TS 25.213 v5.6.0, Jun. 2005.

Third Generation Partnership Project, "Technical Specification Group Radio Access Network; Spreading and Modulation (FDD) (Release 6)," 3GPP TS 25.213 v6.5.0, Mar. 2006.

Third Generation Partnership Project, "Technical Specification Group Radio Access Network; Spreading and Modulation (FDD) (Release 7)," 3GPP TS 25.213 v7.7.0, Dec. 2009.

Third Generation Partnership Project, "Technical Specification Group Radio Access Network; Spreading and Modulation (FDD) (Release 8)," 3GPP TS 25.213 v8.5.0, Dec. 2009.

Third Generation Partnership Project, "Technical Specification Group Radio Access Network; Spreading and Modulation (FDD) (Release 9)," 3GPP TS 25.213 v9.2.0, Oct. 2010.

Third Generation Partnership Project, "Technical Specification Group Radio Access Network; Spreading and Modulation (FDD) (Release 10)," 3GPP TS 25.213 v10.0.0, Oct. 2010.

Third Generation Partnership Project, "Technical Specification Group Radio Access Network; Spreading and Modulation (FDD) (Release 11)," 3GPP TS 25.213 v11.2.0, Jun. 2012.

Third Generation Partnership Project, "Technical Specification Group Radio Access Network; Physical channels and mapping of transport channels onto physical channels (FDD) (Release 1999)," 3GPP TS 25.211 V3.12.0 (Sep. 2002).

Third Generation Partnership Project, "Technical Specification Group Radio Access Network; Physical channels and mapping of transport channels onto physical channels (FDD) (Release 4)," 3GPP TS 25.211 V4.6.0 (Sep. 2002).

Third Generation Partnership Project, "Technical Specification Group Radio Access Network; Physical channels and mapping of transport channels onto physical channels (FDD) (Release 5)," 3GPP TS 25.211 V5.8.0 (Dec. 2005).

Third Generation Partnership Project, "Technical Specification Group Radio Access Network; Physical channels and mapping of transport channels onto physical channels (FDD) (Release 6)," 3GPP TS 25.211 V6.10.0 (Sep. 2009).

Third Generation Partnership Project, "Technical Specification Group Radio Access Network; Physical channels and mapping of transport channels onto physical channels (FDD) (Release 7)," 3GPP TS 25.211 V7.10.0 (Sep. 2010).

Third Generation Partnership Project, "Technical Specification Group Radio Access Network; Physical channels and mapping of transport channels onto physical channels (FDD) (Release 8)," 3GPP TS 25.211 V8.7.0 (Sep. 2010).

Third Generation Partnership Project, "Technical Specification Group Radio Access Network; Physical channels and mapping of transport channels onto physical channels (FDD) (Release 9)," 3GPP TS 25.211 V9.2.0 (Sep. 2010).

(56) References Cited

OTHER PUBLICATIONS

Third Generation Partnership Project, "Technical Specification Group Radio Access Network; Physical channels and mapping of transport channels onto physical channels (FDD) (Release 10)," 3GPP TS 25.211 V10.0.0 (Sep. 2010).
Third Generation Partnership Project, "Technical Specification Group Radio Access Network; Physical channels and mapping of transport channels onto physical channels (FDD) (Release 11)," 3GPP TS 25.211 V11.0.0 (Dec. 2011).
Third Generation Partnership Project, "Technical Specification Group Radio Access Network; Evolved Universal Terrestrial Radio Access (E-UTRA); Physical Channels and Modulation (Release 10)," 3GPP TS 36.211 V10.2.0 (Jun. 2011).
Third Generation Partnership Project, "Technical Specification Group Radio Access Network; Evolved Universal Terrestrial Radio Access (E-UTRA); Physical Channels and Modulation (Release 10)," 3GPP TS 36.211 V10.5.0 (Jun. 2012).
Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 V10.2.0 (Jun. 2011).
Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 V10.6.0 (Jun. 2012).
Third Generation Partnership Project, "Technical Specification Group Radio Access Network; Evolved Universal Terrestrial Radio Access (E-UTRA); Radio Resource Control (RRC); Protocol specification (Release 11)," 3GPP TS 36.331 V11.0.0 (Jun. 2012).

* cited by examiner

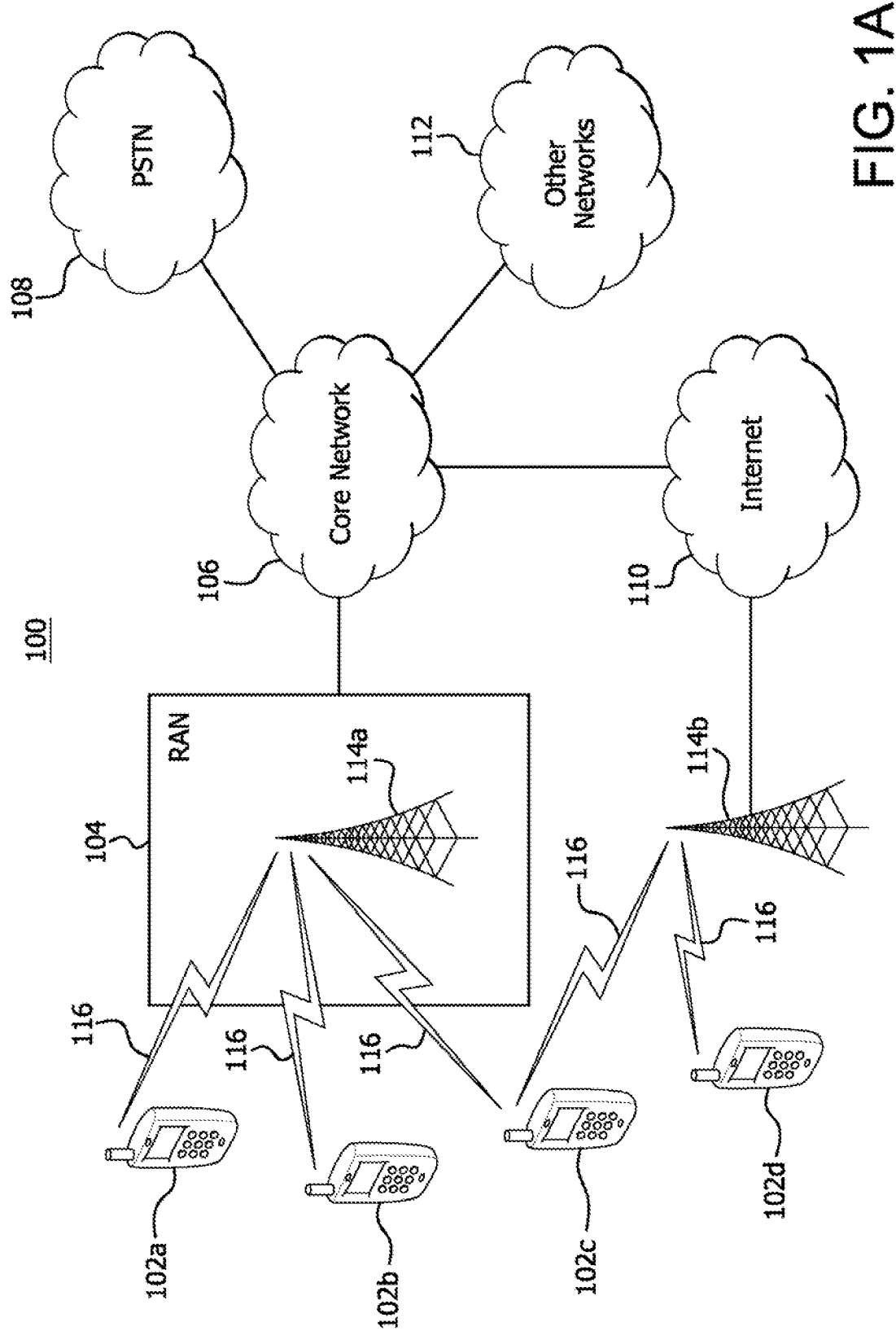

REFERENCE SIGNAL COMMUNICATION IN A WIRELESS NETWORK

CROSS REFERENCE TO RELATED APPLICATIONS

This application is a continuation of U.S. patent application Ser. No. 13/572,040, filed Aug. 10, 2012, which claims the benefit of U.S. Provisional Application No. 61/522,842 filed Aug. 12, 2011, U.S. Provisional Application No. 61/541,714 filed Sep. 30, 2011, U.S. Provisional Application No. 61/555,840 filed Nov. 4, 2011, and U.S. Provisional Application No. 61/591,577 filed Jan. 27, 2012, the contents of which are hereby incorporated by reference herein.

BACKGROUND

In response to increasing demand in terms of higher peak data rate and better user experience from end users, third generation partnership project (3GPP) wireless communication systems involving wideband code division multiple access (WCDMA) technologies have been evolving, whereby many new features have been proposed and specified. For example, a new feature that allows the simultaneous use of two high speed downlink (DL) packet access (HSDPA) downlink carriers has been introduced. This new feature essentially improves the bandwidth usage and user peak downlink rate via frequency aggregation and resource pooling, and was extended to include a multiple-input multiple-output (MIMO) function. Later, four (4) carrier HSDPA (4C-HSDPA) was introduced which allows up to four (4) carriers to operate simultaneously to increase the downlink throughput.

As efforts to improve user experience at cell edge continue, coordinated HSDPA transmission involving multiple cells operates in the same frequency to deploy and support multipoint (MP) downlink transmission. Remote radio head (RRH) is an important technology that may simplify the deployment of the multipoint downlink transmission.

SUMMARY

A method and apparatus for determining pilot information is disclosed. A wireless/transmit receive unit (WTRU) receives a plurality of high speed shared control channel (HS-SCCH) resources including radio resource control (RRC) configuration information for high speed downlink packet access (HSDPA), wherein the RRC configuration information includes dedicated pilot information associated with each received HS-SCCH resource. The WTRU detects a high speed downlink shared channel (HS-DSCH) radio network transmission identifier (H-RNTI) associated with the WTRU in one of the plurality of HS-SCCH resources. The WTRU determines pilot information, based on the dedicated pilot information and the one of the plurality of HS-SCCH resources, for a high speed physically downlink shared channel (HS-PDSCH) associated with the one of the plurality of HS-SCCH resources.

BRIEF DESCRIPTION OF THE DRAWINGS

A more detailed understanding may be had from the following description, given by way of example in conjunction with the accompanying drawings wherein:

FIG. 1A is a system diagram of an example communications system in which one or more disclosed embodiments may be implemented;

DETAILED DESCRIPTION

Figure 1B:
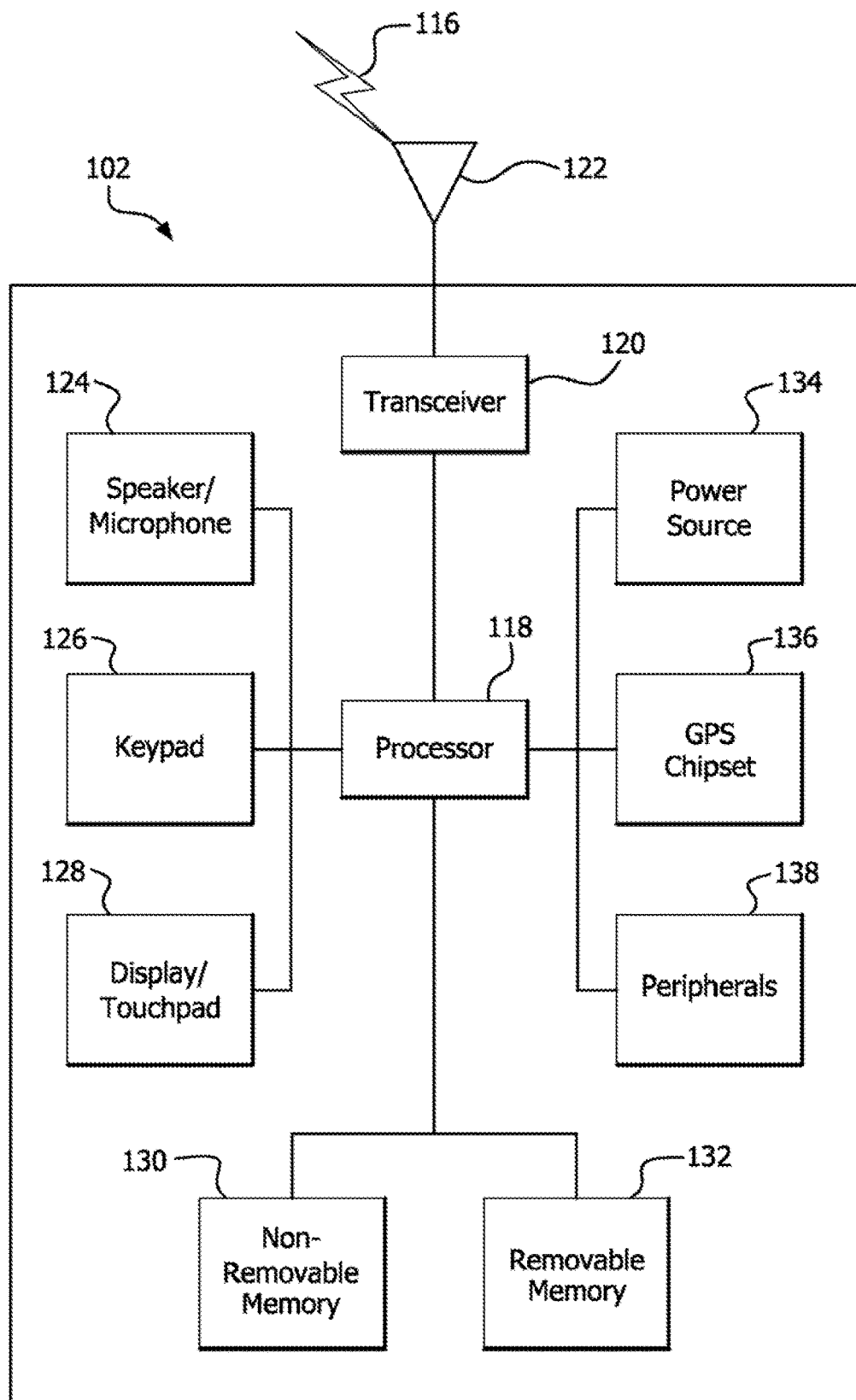
FIG. 1B is a system diagram of an example wireless transmit/receive unit (WTRU) that may be used within the communications system illustrated in FIG. 1A.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications system 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications system 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
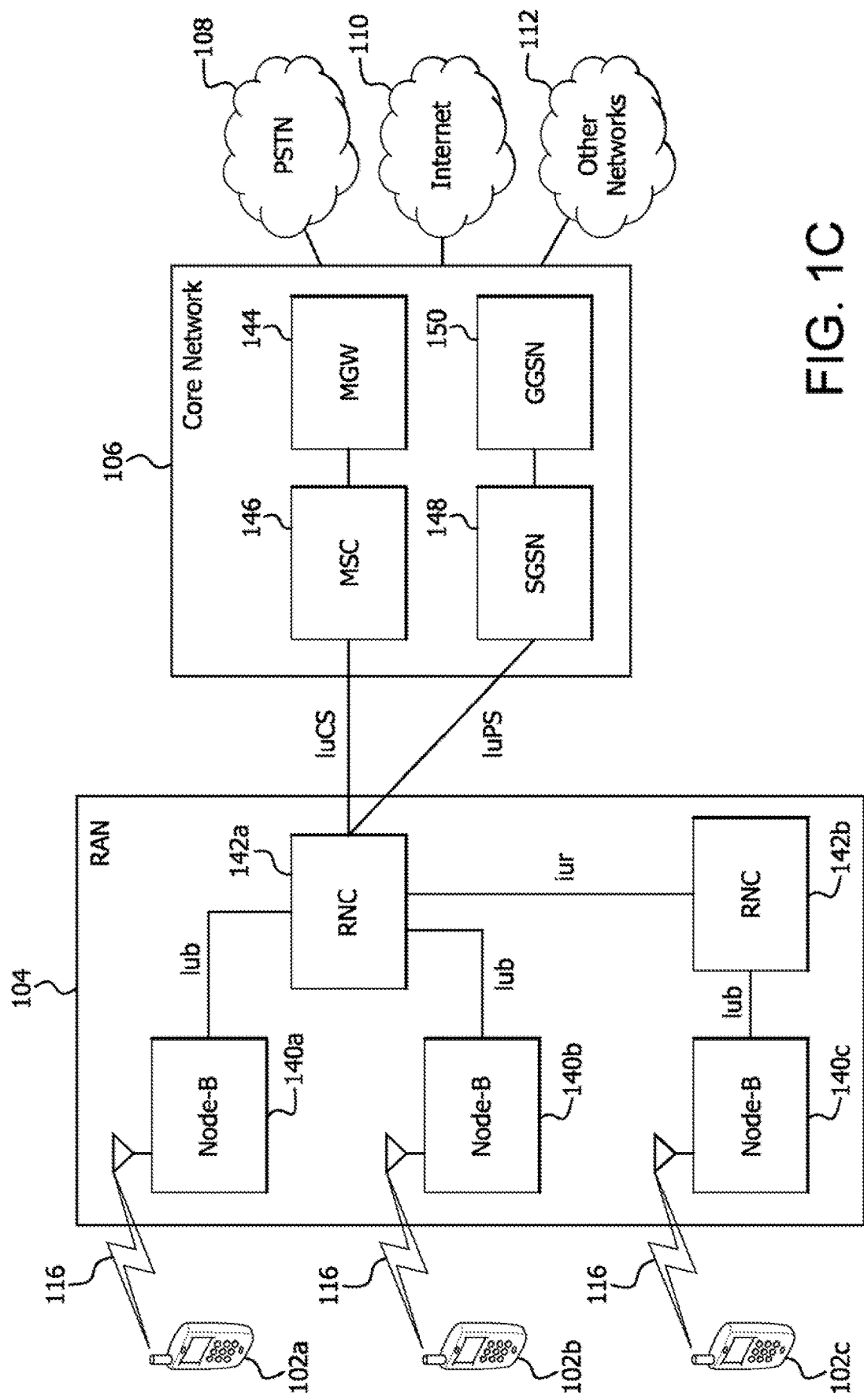
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ a UTRA radio technology to communicate with the WTRUs 102a, 102b, 102c over the air interface 116. The RAN 104 may also be in communication with the core network 106. As shown in FIG. 1C, the RAN 104 may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104. The RAN

104 may also include RNCs 142a, 142b. It will be appreciated that the RAN 104 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 104 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Remote Radio Head (RRH) is an important technology that may simplify the deployment of systems supporting multiple HSDPA transmission, as it allows a plurality of Node-Bs in coordination to be collocated while distributing the transmitted signal to the radio frequency (RF) units in different locations. RRH configurations may also be used for long term evolution (LTE) coordinated multiple point (CoMP) transmission, such as in a homogeneous network with intra-site Comp, a homogeneous network with high transmit (Tx) power RRHs, a heterogeneous network with low power RRHs within the macro-cell coverage with different cell identities (IDs), and a heterogeneous network with low power RRHs within the macro-cell coverage with same cell IDs.

A heterogeneous network with low power RRHs within the macro-cell coverage with same cell IDs may be of particular interest, where a common cell-ID is shared among the transmission points, (macro points and pico points), within the coverage area of a macro point. While maintaining similar cell splitting gain as independent multiple cells, this deployment configuration may offer the advantages of improved coverage of the sync and control channels as they may be commonly transmitted from the multiple points. In addition, the WTRU mobility may be greatly improved in the heterogeneous network, and the number of handovers may be considerably reduced, especially if aggressive use of range extension is employed. Furthermore, as a result of the improved WTRU mobility, the network may dynamically and seamlessly allocate data traffic to the WTRU among various macro and pico cells, leading to additional resource pooling gain for scheduling optimization.

In another aspect, a more realistic deployment scenario relevant to the above cell configuration may consider the RRHs as, or actually consist of, multiple antennas in one base station. While current WCDMA downlink MIMO operations are specified for up to two (2) spatial multiplexing streams in an LTE system, spatial multiplexing on the order of eight (8) may be possible. In order to take advantage of MIMO operations, multiple antennas may be used at both the transmitter and the receiver. Since practical deployment may share some of the antennas for both LTE and WCDMA systems, many sites for WCDMA may have access to two or more antennas.

In one example, four (4) MIMO streams may be supported for HSDPA. This new feature, (referred to hereinafter as "4DL-MIMO"), may have the potential to not only provide doubled peak rates when compared to existing specifications, but also improve spectral efficiency. For example, doubled peak rates may be up to 84 Mbps in a single carrier and potentially up to 672 Mbps when 8 downlink carriers are used simultaneously.

Figure 2:
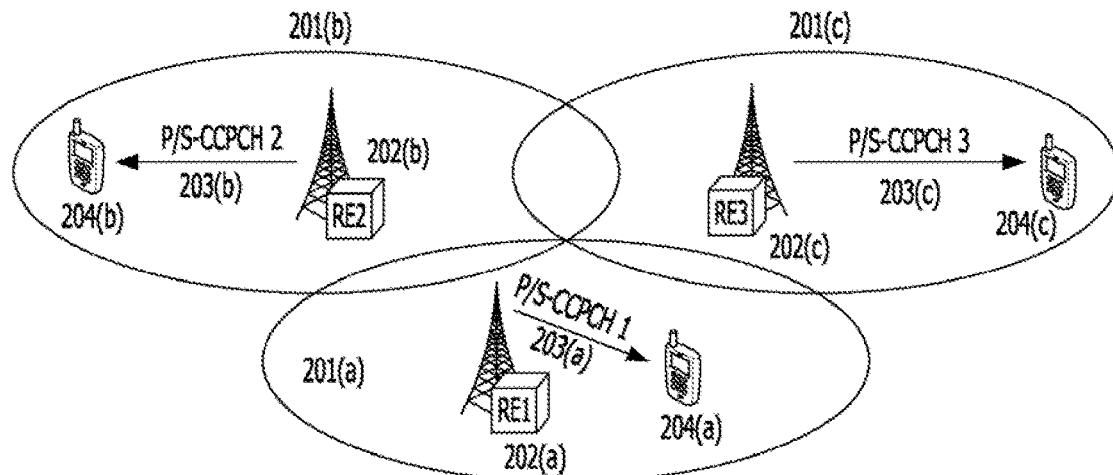
FIG. 2 is an example of a conventional homogeneous network deployment.

FIG. 2 is an example of a conventional homogeneous network deployment. Each cell 201(a), 201(b), and 201(c) has its own network scheduler 202(a), 202(b), and 202(c). Each WTRU 204(a), 204(b), and 204(c) receives a scrambling code 203(a), 203(b), and 203(c) from its own network scheduler 202(a), 202(b), and 202(c).

In a homogenous network deployment in a UMTS wireless cellular system, the radio equipment (RE), which includes the functionalities of the baseband and layer 2 processing, may be co-located with the transmission point, as shown in FIG. 2. Each cell may be associated with a transmission point that covers a geographic area where WTRUs in the area may be served with data transmission scheduled by a network scheduler located in the RE. In order to improve the use of the frequency spectrum, a frequency reuse factor of 1 may be adopted thereby allowing an adjacent cell to operate in the same frequency band. To assist the WTRU to identify a serving cell in the cell searching process and mitigate the inference from other cells, a unique scrambling code may be assigned to each cell that operates at the front end of the baseband process at the WTRU to suppress the signal from other cells. Common control physical channels (CCPCHs) may be broadcasted from each cell. The CCPCHs may carry important system configuration parameters associated with a cell that may be uniquely identified by the WTRU using a special scrambling code. The scrambling code may be used as a unique cell ID for that cell in a UMTS system.

Figure 3:
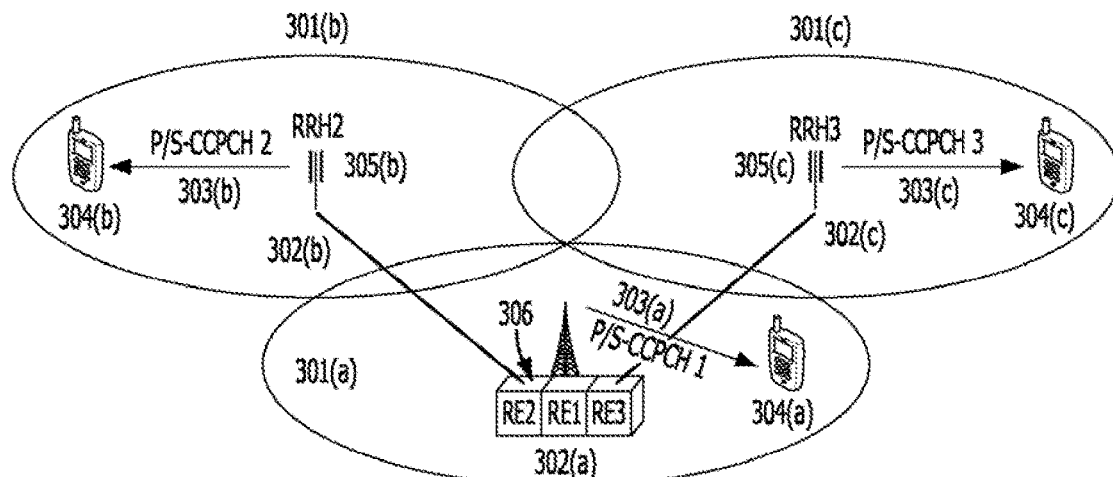
FIG. 3 is an example of a network deployment with RRH, wherein the RRH acts as an independent cell.

FIG. 3 is an example of a network deployment with RRH, wherein the RRH acts as an independent cell. Each cell 301(a), 301(b), and 301(c) has its own network scheduler 302(a), 302(b), and 302(c). Each WTRU 304(a), 304(b), and 304(c) receives a scrambling code 303(a), 303(b), and 303(c) from its own network scheduler 302(a), 302(b), and 302(c), respectively. Cells 301(b) and 301(c) include an RRH 305(b) and 305(c), respectively, each with their own REs 306 located in a centralized location, cell 301(a).

By introducing RRH 305(*b*) and 305(*c*), the REs 306 may be separated from the transmission points, where the RRHs 305(*b*) and 305(*c*) are connected to REs 306 by high speed and low latency backhaul links. Without changing the cell configuration, a deployment strategy is illustrated in FIG. 3, where an RRH 305(*b*) or 305(*c*) may serve as a completely independent cell, identified by its own scrambling code that serves its own scheduling area, though the REs 306 are centralized at different locations.

Figure 4:
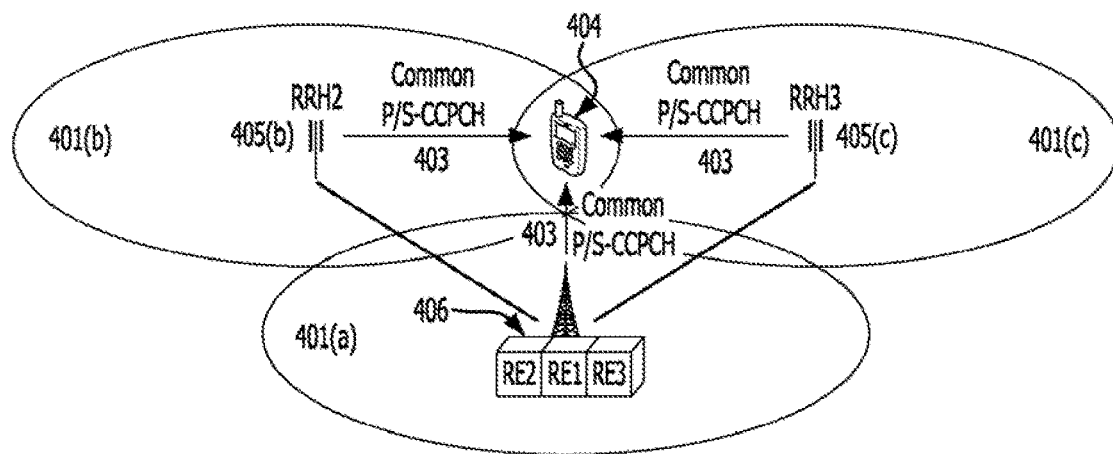
FIG. 4 is an example of utilizing common scrambling code (CSC) among RRHs in UMTS.

FIG. 4 is an example of utilizing common scrambling code (CSC) among RRHs in UMTS. Cell 401(*b*) and 401(*c*) include an RRH 405(*b*) and 405(*c*), respectively, each with their own REs 406 located in a centralized location, cell 401(*a*). All three cells 401(*a*), 401(*b*), and 401(*c*) utilize a common scrambling code (CSC) 403. Data may be transmitted simultaneously from different transmission points to the same WTRU 404.

In order to improve the throughput performance for the WTRUs at the cell edge and in order to enhance WTRU mobility, the concept of using common scrambling code (CSC) 403 among the RRHs 405(*b*) and 405(*c*) may be implemented as shown in FIG. 4.

A common scrambling code may be utilized among different RRHs using any one or a combination of the following six techniques.

In a first technique, a common broadcast channel may be transmitted with the same scrambling code. For example, a common broadcast channel may be a primary/secondary (P/S) CCPCH.

In a second technique, one or more physical channels may be similarly transmitted across the RRHs, while the other may be different. For example, one or more physical channels may be a high speed-physical downlink shared channel (HS-PDSCH) and a high speed dedicated physical control channel (HS-DPCCH).

In a third technique, each RRH may be characterized as a single cell in terms of scheduling and may have its own resource management though sharing the common scrambling code.

In a fourth technique, the schedulers in the CSC set may work jointly in a coordinated manner.

In a fifth technique, the cells in the CSC set may operate in the same frequency.

In a sixth technique, each RRH may transmit with a different transmission power that may be dynamically changed.

Depending on various data scheduling options, a number of operation modes with CSC may be used. The different operation modes are described below.

Figure 5:
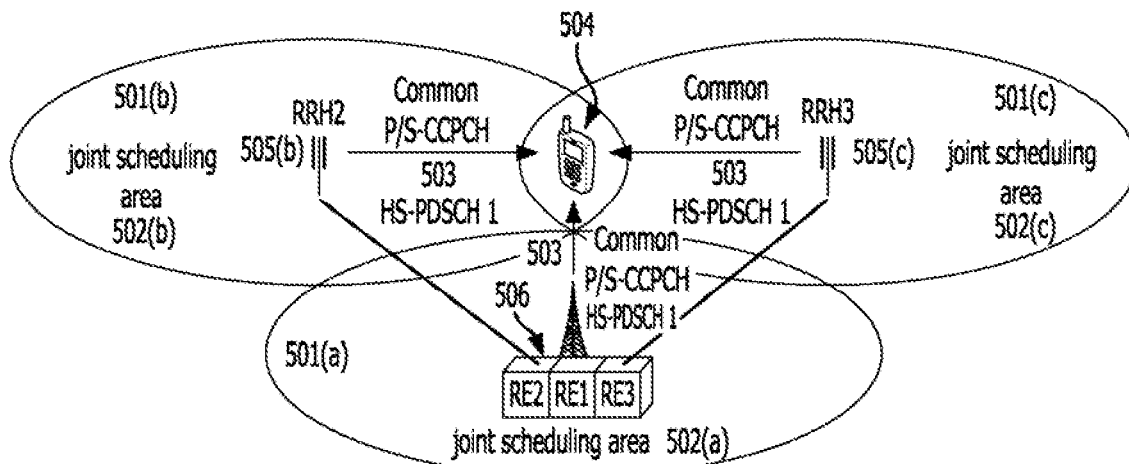
FIG. 5 is an example of joint MP-HSDPA transmission mode.

FIG. 5 is an example of joint MP-HSDPA transmission mode. Cell 501(*b*) and 501(*c*) include an RRH 505(*b*) and 505(*c*), respectively, each with their own REs 506 located in a centralized location, cell 501(*a*). All three cells 501(*a*), 501(*b*), and 501(*c*) utilize a CSC 503. Each cell 501(*a*), 501(*b*), and 501(*c*) has its own joint scheduler 502(*a*), 502(*b*), and 502(*c*). Data may be transmitted simultaneously from different transmission points to the same WTRU 504.

In a joint MP-HSDPA transmission, identical downlink signals carrying the same data may be transmitted simultaneously from different transmission points to the same WTRU 504, as illustrated in FIG. 5. These signals may be combined over the air before arriving at the WTRU receiver, so that the WTRU receiver perceives an enhanced signal overall. The transmission mode may be of particular use for the WTRU at cell edge where the WTRU may suffer severe inter-cell interference. All physical channels, (P/S CCPCH, common pilot channel (CPICH), high speed shared control channel (HS-SCCH), HS-PDSCH, dedicated physical data channel (DPDCH), and the like), may be transmitted this way. Because the WTRU is capable of performing channel state information (CSI) estimation and data demodulation based on the combined pilot signal carried by the CPICH, the WTRU may operate as if it is served by a single cell.

For joint MP-HSDPA transmission mode, the same data stream from a higher layer may be transmitted to REs of each cell and the schedulers for the cells involved in the joint transmission may be operating jointly to schedule the same data to the WTRU. To further enhance the downlink transmission reliability, different precoding weights may be applied across the transmission points to adjust the transmission phase or the amplitude individually. The selection of the precoding weights may require the WTRU to distinguish the signal path from each transmission point individually. Thus, the pilot may be identified for each cell and the WTRU may measure preferred precoding weights and signal the preferred precoding weights to the network via uplink feedback.

Figure 6:
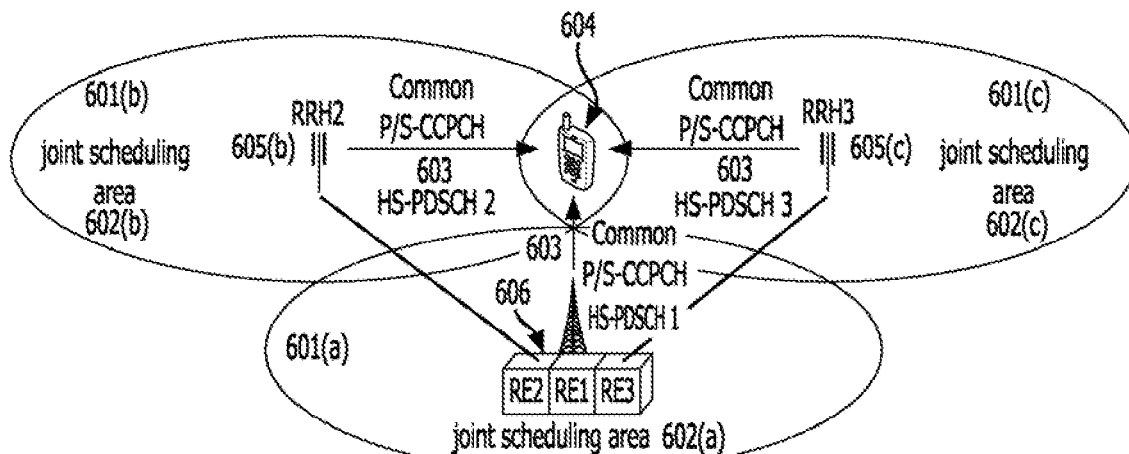
FIG. 6 is an example of multiflow aggregation to the same WTRUs.

FIG. 6 is an example of multiflow aggregation to the same WTRUs. Cell 601(*b*) and 601(*c*) include an RRH 605(*b*) and 605(*c*), respectively, each with their own REs 606 located in a centralized location, cell 601(*a*). All three cells 601(*a*), 601(*b*), and 601(*c*) utilize a CSC 603. Each cell 601(*a*), 601(*b*), and 601(*c*) has its own joint scheduler 602(*a*), 602(*b*), and 602(*c*). Data may be transmitted simultaneously from different transmission points to the same WTRU 604.

In a mode of operation using multiflow aggregation to the same WTRUs, different data may be transmitted simultaneously from different transmission points to the same WTRU 604 as shown in FIG. 6. The WTRU may demodulate the signals from each cell individually, and the data from each cell may be aggregated to get a higher throughput. Due to operation in the same frequency and the same scrambling code for all cells involved in the multiflow transmission, and because of the interference from other transmission points, it may be desirable to suppress the interference at the WTRU demodulator. This issue may be effectively resolved by exploring the spatial differences among the transmission points and realizing the spatial multiplexing gain like a MIMO system does. Thus, the WTRU may be equipped with multiple antennas and a MIMO type of receiver structure.

For HSDPA transmission, high speed data may be transmitted via various HS-PDSCHs from each transmission point with different transport block sizes, or codeword sizes, which may be indicated to the WTRU by a corresponding HS-SCCH transmitted from that cell. The data stream may be split and fed to each RE differently. The schedulers at each cell may operate independently to schedule the data simultaneously or at different time instances. Alternatively, the schedulers may be coordinated to achieve a certain way of optimization, either in terms of interference reduction or other aspects.

Implementing the MIMO receiver may require the accurate estimation of the signal paths for each transmission point. Thus, distinguishable pilots or CPICHs may be designed for each transmission point to perform the channel estimation. As a more advanced option, the multiple data flows may be processed by a precoding matrix and transmitted at each transmission point. This precoding matrix may be selected by the WTRU based on the channel conditions of each signal path, or selected by the network according to scheduling needs. As a result, a data flow may be transmitted across all the transmission points depending on the configuration of the precoding matrix.

In an example of the scheduling option, one data flow may be transmitted to a WTRU. However, this data transmission may be dynamically switched among the cells depending on the channel conditions. The schedulers may jointly operate to select a transmission point based on signal quality.

Figure 7:
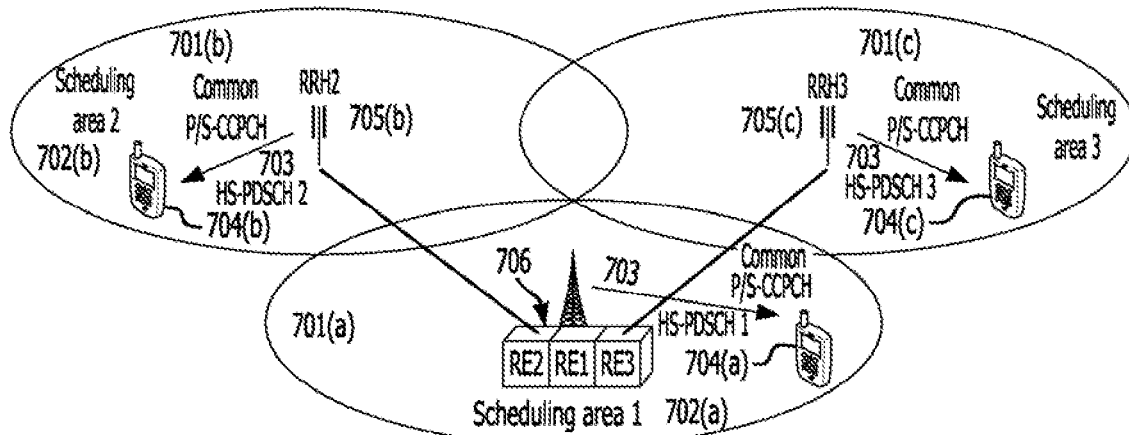
FIG. 7 is an example of multiflow aggregation for single cell transmission to a single WTRU.

FIG. 7 is an example of multiflow aggregation for single cell transmission to a single WTRU. Cell 701(*b*) and 701(*c*) include an RRH 705(*b*) and 705(*c*), respectively, each with their own REs 706 located in a centralized location, cell 701(*a*). All three cells 701(*a*), 701(*b*), and 701(*c*) utilize a CSC 703. Each cell 701(*a*), 701(*b*), and 701(*c*) has its own network scheduler 702(*a*), 702(*b*), and 702(*c*). Each WTRU 704(*a*), 704(*b*), and 704(*c*) receives a CSC 703 from its own network scheduler 702(*a*), 702(*b*), and 702(*c*), respectively.

As shown in FIG. 7, a single cell transmission to a single WTRU is similar to the aggregation transmission mode, except that multiple data flows are transmitted from the multiple cells and the multiple data flows are addressed to various WTRUs. Each WTRU may only need one receiver to demodulate the data addressed to it. The HS-SCCH that carries the control information for the corresponding HS-PDSCH data transmission may be identified by a unique ID of the receiving WTRU. The WTRU may be equipped with multiple antennas and a MIMO receiver in order to suppress the interference from other transmission points, or other data flows simultaneously transmitted in the same frequency and same scrambling code. This way of receiving data is similar to the concept of multi-user MIMO (MU-MIMO) in LTE, except that the data transmission is now carried over multiple transmission points using the same scrambling code. The advantage of this transmission mode is that it allows for the cell splitting gain to be realized thereby effectively improving the overall system capacity.

The schedulers among the CSC set may work jointly to schedule the data to minimize cross interference between the WTRUs. The multiflow transmission may also be processed by a precoding matrix before transmission. A data flow addressed to a WTRU may be associated to a specific set of precoding weights, rather than a cell. The WTRU may be required to report to the network its preferred precoding weights based on a measured channel condition. For the purpose of reducing cross interference, it may be desirable for the WTRU to select precoding weights based on the CSI for all the signal paths for the transmission points involved in the transmission.

To support legacy WTRUs that are not designed for the CSC operation, a network scheduler may rely on available channel quality indicator (CQI) and precoding control indicator (PCI) information estimated by the WTRU to make scheduling decisions for transmissions. This does not require that the WTRU to be aware of the multipoint operation.

Figure 8:
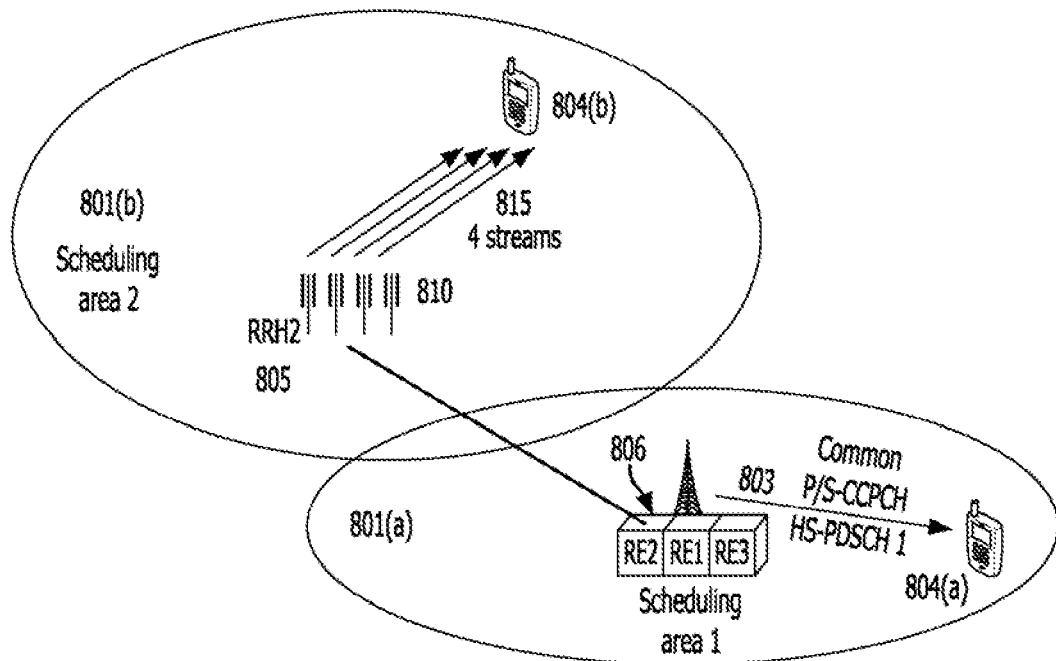
FIG. 8 is an example of 4 branch DL-MIMO operating at individual RRH.

FIG. 8 is an example of 4 branch DL-MIMO operating at an individual RRH. Cell 802(*b*) includes an RRH 805 with its own RE 806 located in a centralized location, cell 801(*a*). RRH 805 includes multiple antennas 810 which support multiple data streams 815.

As a more practical deployment scenario, as illustrated in FIG. 8, each RRH may also include multiple antennas that may support multiple data streams. In the single point multi-antenna transmission operation mode, 4-branch DL-MIMO, each RRH, supported by its own scheduler, may be considered as an independent single point transmission operation with downlink MIMO with more than two layers.

Figure 9:
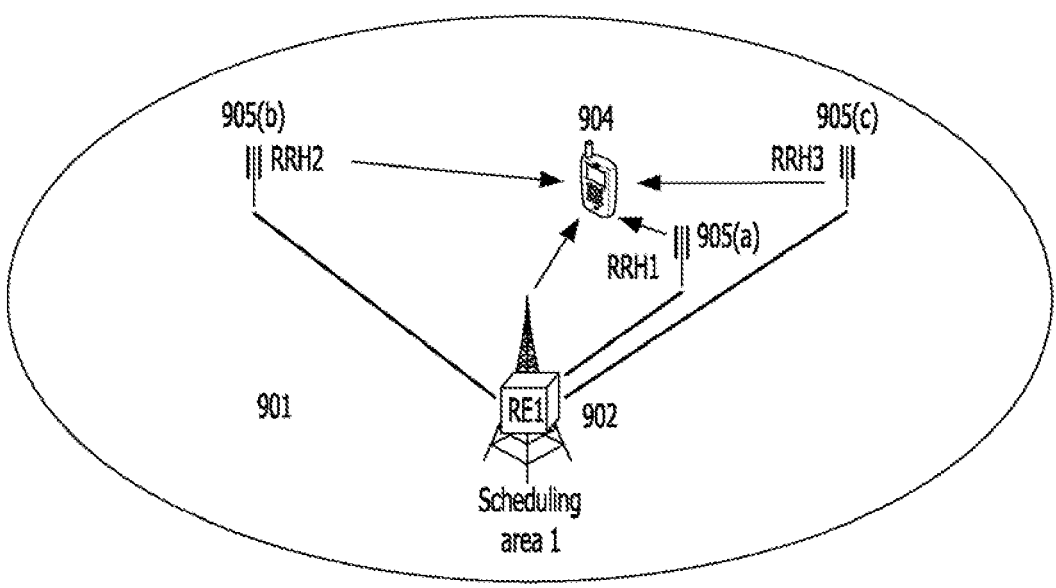
FIG. 9 is an example of 4 branch DL-MIMO when RRHs are used as simple antenna extensions.

FIG. 9 is an example of 4 branch DL-MIMO when RRHs are used as simple antenna extensions. Cell 901 includes RRHs 905(*a*), 905(*b*), and 905(*c*). RRHs 905(*a*), 905(*b*), and 905(*c*) utilize common network scheduler 902.

In a similar deployment scenario, the antennas of the RRHs are may be considered as the antenna extension of the primary base station shown in FIG. 9. Here, additional schedulers associated with the individual RRHs may not be needed. Therefore, the combination of the primary base station and the RRHs may include a common scheduling area. The 4DL-MIMO design may also include a design where the antennas are co-located within the base station with optional RRH deployment.

A similar concept of same cell ID with RRH configurations is proposed in LTE coordinated multipoint (CoMP) and may be extended to HSDPA in the UMTS cellular network. As a proposed embodiment, a common scrambling code may be shared among the cells connected with RRH in order to improve the WTRU mobility and enhance the coverage of the control signals.

Pilot design may be introduced to multiple downlink antennas, specifically 4DL-MIMO, and the RRH deployment to HSDPA, as there are only two pilots in existing DL-MIMO that may support up to rank 2 transmission. Further, while the concepts described herein are described in the context of 4 DL antennas, the concepts may also be applied to other antenna configurations, for example, 8 or more DL antennas. Therefore, when referring to 4-branch MIMO operations, it should be understood that this also refers to more than 4-branch operations, (e.g. 8-branch MIMO operations).

The CPICH is a common pilot channel designed in UMTS to aid the channel estimation at the WTRU for downlink data transmissions. The CPICH may be scrambled with a unique scrambling code for each cell. Therefore, the CPICH may be considered to be cell-specific. New types of pilot channels may be used to accommodate different transmission modes in the CSC operation.

A common pilot channel is a pilot channel transmitted from all the transmission points and may be scrambled with a scrambling code used in the CSC operation. The common pilot channel may be received by all of the WTRUs being served in the CSC area. A P-CPICH may be used that has a slot format of 20 bits/slot and a modulating bit sequence of all 0s, may be directly used for this purpose. Optionally, other modulating bit sequences may be used to differentiate the CSC operation.

When REs are not co-located with the transmission points, advanced timing adjustment may be required for the baseband processing occurring at REs to ensure that the signals from each of the transmission points are accurately synchronized. Because this common pilot channel is intended to serve all of the WTRUs in an area, no cross-site precoding weights may be applied to the common pilot channel, in case other physical channels are precoded for performance enhancement.

For the joint transmission mode, the common pilot channel may be sufficient for the WTRU to perform channel estimation and to demodulate the data, if no cross-cell precoding is employed.

In a cell-specific or transmission-point specific pilot channel, each cell may transmit a pilot channel distinguishable from other cells. The cell-specific pilot channel may be designed to allow a WTRU to perform channel estimation for each individual signal path to the transmission points. Therefore, the cell-specific pilot channels may be orthogonal or close to orthogonal to single out the desired signal for the channel estimation.

The orthogonality of the cell-specific pilot channels may be maintained by using an orthogonal modulating bit sequence. The bit sequences fed into the modulation mapped may be pre-defined differently for each of the cell-specific pilot channels. These bit sequences may be selected from a pool of orthogonal binary sequences of the similar slot format of CPICH. Table 1 is an example of orthogonal binary bit sequence used in the pilot channel.

TABLE 1

| | even | | | | | | | | | | | | | | | | | | | |
|---|---|---|---|---|---|---|---|---|---|---|---|---|---|---|---|---|---|---|---|---|
| bit sequence | 0 | 0 | 0 | 0 | 0 | 0 | 0 | 0 | 0 | 0 | 0 | 0 | 0 | 0 | 0 | 0 | 0 | 0 | 0 | 0 |
| bit sequence | 0 | 0 | 1 | 1 | 1 | 1 | 0 | 0 | 0 | 0 | 1 | 1 | 1 | 1 | 0 | 0 | 0 | 0 | 1 | 1 |
| bit sequence | 1 | 1 | 0 | 0 | 1 | 1 | 0 | 0 | 1 | 1 | 0 | 0 | 1 | 1 | 0 | 0 | 1 | 1 | 0 | 0 |
| bit sequence | 1 | 1 | 1 | 1 | 0 | 0 | 0 | 0 | 1 | 1 | 1 | 1 | 0 | 0 | 0 | 0 | 1 | 1 | 1 | 1 |
| | odd | | | | | | | | | | | | | | | | | | | |
| bit sequence | 0 | 0 | 0 | 0 | 0 | 0 | 0 | 0 | 0 | 0 | 0 | 0 | 0 | 0 | 0 | 0 | 0 | 0 | 0 | 0 |
| bit sequence | 1 | 1 | 0 | 0 | 0 | 0 | 1 | 1 | 1 | 1 | 0 | 0 | 0 | 0 | 1 | 1 | 1 | 1 | 0 | 0 |
| bit sequence | 1 | 1 | 0 | 0 | 1 | 1 | 0 | 0 | 1 | 1 | 0 | 0 | 1 | 1 | 0 | 0 | 1 | 1 | 0 | 0 |
| bit sequence | 0 | 0 | 0 | 0 | 1 | 1 | 1 | 1 | 0 | 0 | 0 | 0 | 1 | 1 | 1 | 1 | 0 | 0 | 0 | 0 |

As shown in Table 1, the binary bit sequences may have a pattern defined, where the length of the sequence covers two time slots. Bit sequences of longer length (such as 4 or 8 slots) may also be used, which may generate more orthogonal choices. Use of an orthogonal sequence by the CSC cells may be assigned by a UTRAN, and indicated to a Node-B and a WTRU at a radio resource control (RRC) configuration. For example, the Node-B and WTRU may be informed of the orthogonal sequence via dedicated signaling or system information blocks (SIBs).

The orthogonality of the cell-specific pilot channels may be maintained by using different channelization codes. With a spreading factor made equal to 256, (same as the CPICH), different channelization codes may be applied to the cell-specific pilot channels. As the channelization codes are orthogonal by nature, the pilot channels may be orthogonal from each other. For example, channelization codes, $C_{256,2}$ and $C_{256,3}$ may be candidates for the new pilot channels. The WTRU may obtain the channelization code and pilot information via dedicated RRC signaling or via the SIBs. Alternatively, the actual channelization codes used and pilot patterns may be pre-defined.

The orthogonality of the cell-specific pilot channels may be maintained by using different scrambling codes. The cell-specific pilot channels may be transmitted differently by each cell under a different scrambling code. Although the pilot channels may not be perfectly orthogonal, the residual may be small enough to carry out the channel estimation at the WTRU receiver. Use of orthogonal sequences by the CSC cells may be assigned by a UTRAN, informed to a Node-B and a WTRU at an RRC configuration.

The orthogonality of the cell-specific pilot channels may be maintained by time division multiplexing (TDM) the pilot channels. The transmit points in the CSC set may be coordinated in transmitting the pilot channel in a time switched manner, using the same bit sequence, channelization code, and scrambling code. As long as the network informs the WTRU of the schedule of the pilot channel transmission, the WTRU may perform individual channel estimation for a cell for the specified duration.

The orthogonality of the cell-specific pilot channels may be maintained by overhead reduction. Introducing additional pilot channels may increase the control channel overhead and thus reduce efficiency of the data transmission. To mitigate the impact, a gated transmission may be adopted that only allows the transmission to take place within a specified duty cycle. In addition, the transmit power of the cell-specific pilot channel may be scaled down. In such cases, the WTRU may be informed of the power difference between the primary CPICH and the other pilot(s) via RRC signaling. This may allow the WTRU to compensate for the difference in transmission power in order to estimate the true channel.

The CPICH is a common pilot channel designed in UMTS to aid the channel estimation at the WTRU for downlink data transmission. In 2-Tx DL MIMO, each antenna may have a common pilot channel so that the WTRU may compute the channel estimate for the antenna. This concept may be extended to 4-Tx DL MIMO, or more antennas, with a separate common pilot channel for each antenna. When 4-Tx DL MIMO is supported, the four common pilot channels may be transmitted and used for both data demodulation and measuring CSI. A similar concept may apply when more than 4 antennas are configured.

Each of the CPICHs may be spread using a unique channelization code. Since the channelization codes are orthogonal, the WTRU may be able to determine unique channel estimates for each antenna. However, this may reduce the number of available codes for other physical channels and code usage may be an issue.

To avoid any issues related to code usage, each CPICH may transmit an orthogonal pilot sequence and use the same channelization code. This may be used in various combinations of channelization codes and orthogonal pilot sequences. For example, in 4-Tx DL MIMO, each CPICH may transmit an orthogonal pilot sequence, and all four CPICHs may be spread with the same channelization code (e.g., $C_{256,0}$), or two orthogonal pilot sequences and two different channelization codes.

Another potential issue related to using one CPICH per antenna is the presence of increased control channel overhead. To reduce the impact of additional CPICHs, the Node-B may periodically transmit the new CPICHs and/or transmit them at a lower power than the legacy CPICHs. When the new CPICHs are transmitted at a lower power, they may be used for CSI measurements. If the new CPICHs are needed for data demodulation, the Node-B may increase the power on the new CPICHs. However, the WTRU may need to know the change in CPICH power when it occurs for accurate CSI measurements. Also, increasing the CPICH power may increase the inter Node-B interference and may require additional pilot interference cancellation at the WTRU.

Figure 10:
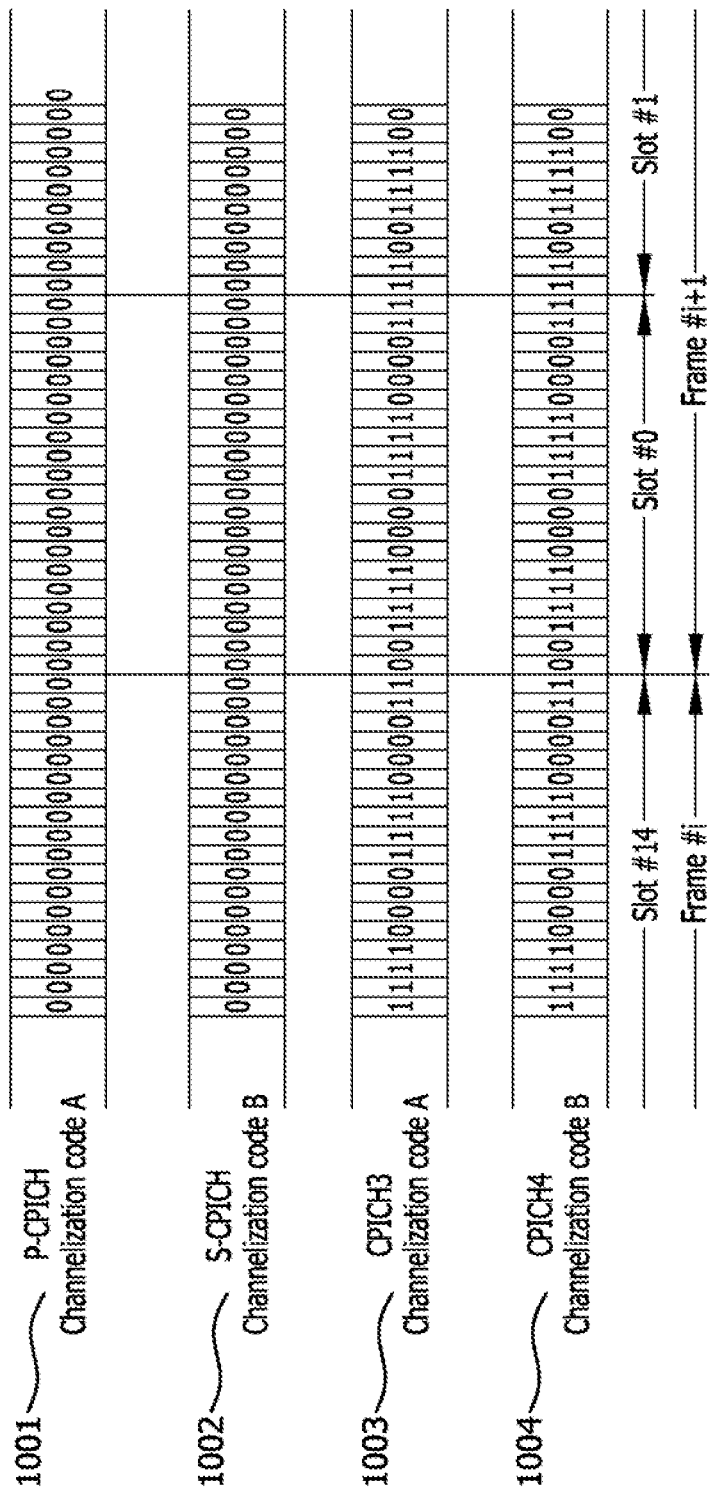
FIG. 10 is an example modulation pattern and channelization code assignment for four common pilot channels.

Common pilot design considerations may be made for co-scheduled 4-branch MIMO and legacy 2-branch MIMO systems. When downlink (2-branch) MIMO is configured, the two pilot channels P-CPICH and S-CPICH may use two different channelization codes. When 4-branch MIMO is configured, although it may be challenging to co-schedule a 4-branch MIMO WTRU, the legacy WTRU may use 4 physical antennas by using a virtual antenna, a 4-branch MIMO WTRU and a 2-branch WTRU that use only 2 physical antennas may be co-scheduled. Therefore, it may be beneficial to keep the P-CPICH and S-CPICH pilot channel setting the same as the one required by legacy 2-branch MIMO when 4-branch, or more, MIMO is configured. Consequently, for the 4-branch MIMO case, the third and fourth common pilots CPICH3 and CPICH4 may share the two channelization codes with the P-CPICH and S-CPICH, while the pilot bit patterns may be orthogonal to the one used in P-CPICH and S-CPICH as shown in FIG. 10. FIG. 10 is an example modulation pattern and channelization code assignment for four common pilot channels. The four common pilot channels in FIG. 10 are P-CPICH 1001, S-CPICH 1002, CPICH3 1003, and CPICH4 1004. P-CPICH 1001 and CPICH3 1003 share channelization code A. S-CPICH 1002 and CPICH4 1004 share channelization code B.

Instead of sharing the P-CPICH and S-CPICH pilot channels between 4-branch MIMO WTRUs and legacy 2-branch MIMO WTRUs, another example may be to introduce four new common pilot channels, on top of the existing P-CPICH and S-CPICH pilot channels. The benefit of this pilot configuration scheme is that the legacy 2-branch MIMO WTRUs may be co-scheduled with 4-branch MIMO WTRUs, and the legacy 2-branch MIMO WTRUs may make full use of the four physical transmit antennas at the same time. If the four new common pilot channels are labeled as CPICH1, CPICH2, CPICH3, and CPICH4, the configuration of P-CPICH and S-CPICH may be the same as for the legacy 2-branch MIMO WTRUs as shown in FIG. 10.

Figure 11:
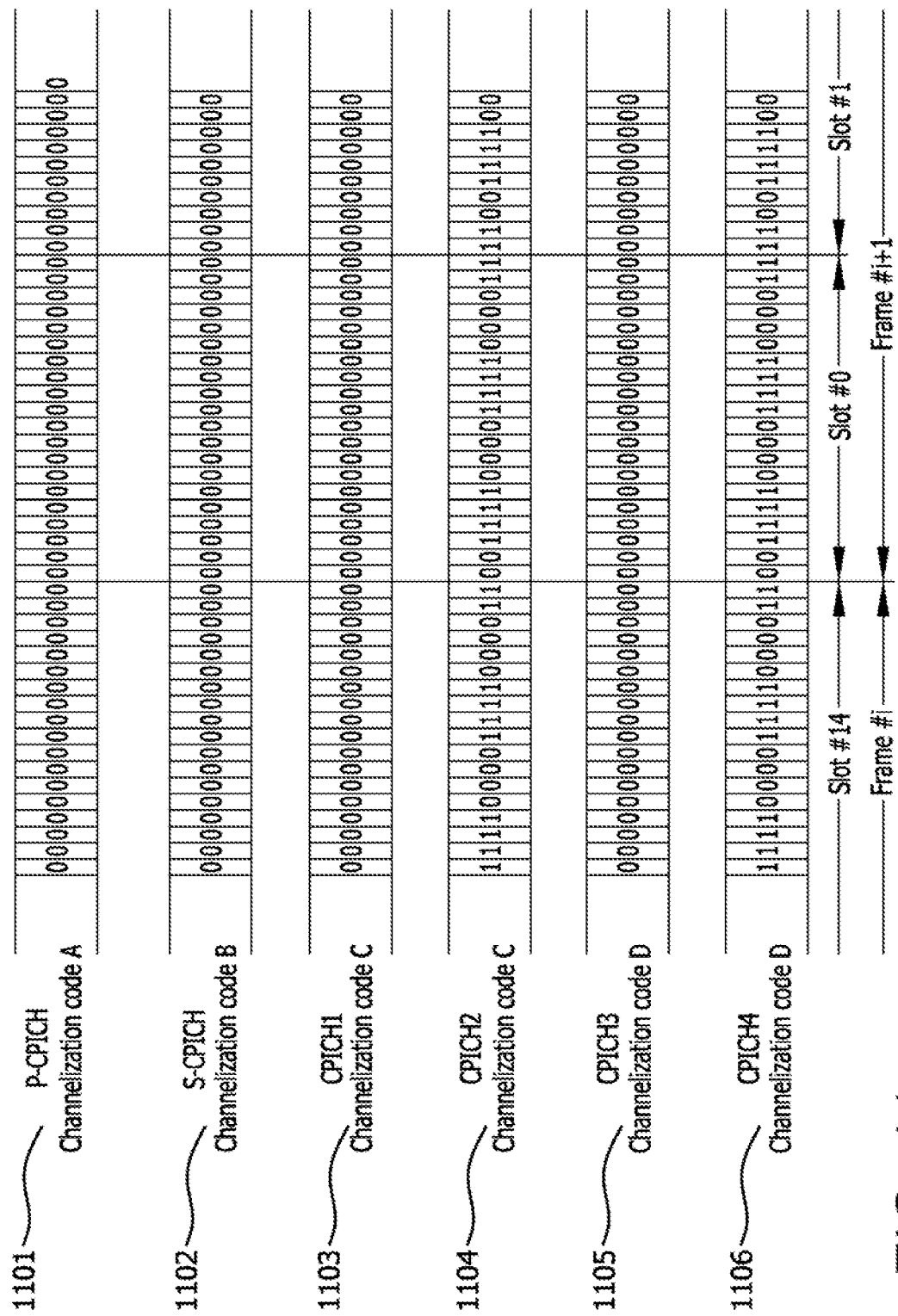
FIG. 11 is a first example modulation pattern and channelization code assignment for six common pilot channels.

FIG. 11 is a first example modulation pattern and channelization code assignment for six common pilot channels. The 6 common pilot channels in FIG. 11 are P-CPICH 1101, S-CPICH 1102, CPICH1 1103, CPICH2 1104, CPICH3 1105, and CPICH4 1106. CPICH1 1103 and CPICH2 1104 share channelization code C. CPICH3 1105 and CPICH4 1106 share channelization code D. The orthogonality between CPICH1 and CPICH2 and the orthogonality between CPICH3 and CPICH4 may be guaranteed by applying two orthogonal pilot patterns, as shown in FIG. 11.

Figure 12:
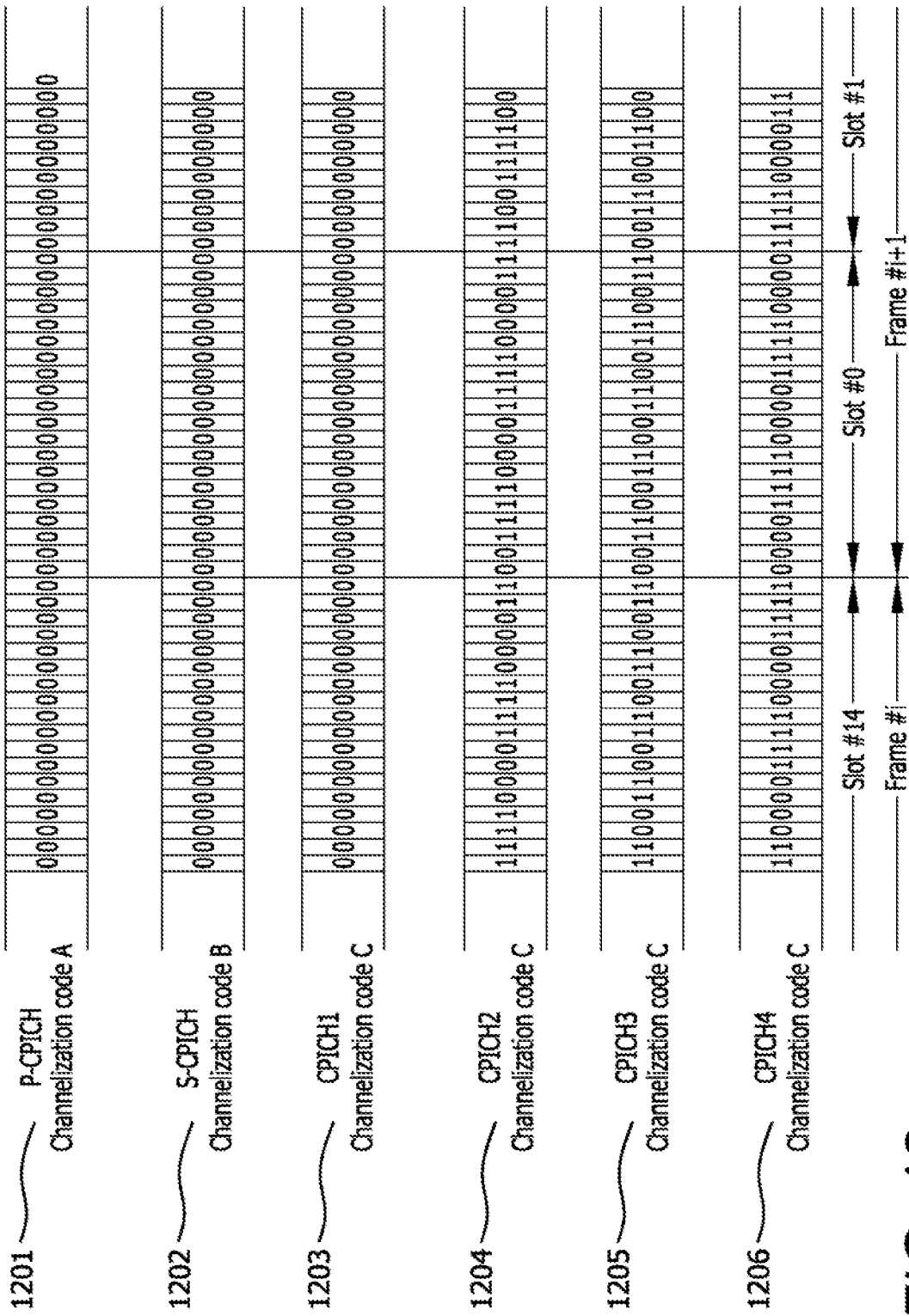
FIG. 12 is a second example modulation pattern and channelization code assignment for six common pilot channels.

FIG. 12 is a second example modulation pattern and channelization code assignment for six common pilot channels. The 6 common pilot channels in FIG. 12 are P-CPICH 1201, S-CPICH 1202, CPICH1 1203, CPICH2 1204, CPICH3 1205, and CPICH4 1206. To save the usage of DL channelization codes, the new four common pilot channels CPICH1 1203 and CPICH2 1204, CPICH3 1205 and CPICH4 1206 share the same channelization code C, while the orthogonality among the four new pilot channels may be kept by using orthogonal pilot sequences as shown in Table 1.

The WTRU-specific pilot channel may be generated in a similar way as the cell-specific pilot channel. The difference between the WTRU-specific pilot channel and the cell-specific pilot channel is that the WTRU-specific pilot channel is introduced to serve a specific WTRU or specific group of WTRUs. Therefore the WTRU-specific pilot channel may be precoded with the precoding weights obtained from the channel conditions for that WTRU. The WTRU-specific pilot channel may be transmitted from one cell or jointly transmitted from multiple cells. For data demodulation, one pilot per stream may be needed, whereas for CSI reporting purposes, one pilot per antenna may be required.

For example, for every scheduled 4-branch MIMO WTRU, up to 4 WTRU-specific pilot channels may need to be transmitted, and 4 new common pilot channels may also be needed for CSI feedback generation for 4-branch MIMO WTRUs in order to make the 4-branch MIMO fully transparent to legacy 2-branch MIMO WTRUs so that 4-branch MIMO WTRUs and 2-branch MIMO WTRUs may be co-scheduled in the same subframe. However, this may require a significant amount of channelization codes in the downlink if code multiplexing pilot channels are based on channelization codes. For the 4 new common pilot channels, the channels may be transmitted with a lower duty cycle than WTRU-specific pilot channels, and therefore they may be transmitted in a time multiplexing fashion so that the channels may share a common channelization code.

Several of the embodiments described below may significantly reduce the amount of required channelization codes for transmission of WTRU-specific pilot channels.

A first family of separate channelization code (code division multiplexed (CDM)) solutions may consist of the WTRU receiving the pilot symbols over a separate channelization code. In one embodiment, all WTRU-specific pilot channels may be transmitted over one common channelization code such that the WTRU-specific pilot channels may be orthogonal to all other legacy downlink channels, such as P-CPICH, S-CPICH, and HS-PDSCH, and the like. Orthogonality of the WTRU-specific pilots within each WTRU, and orthogonality of the WTRU-specific pilots among different WTRUs may be achieved by using orthogonal pilot sequences under the same channelization code. In this embodiment, a pilot resource may be uniquely identified by a (RRC configured, static) channelization code and a pilot sequence index. Using a static channelization code, the WTRU may only need to be signaled by the pilot sequence index on a dynamic basis.

In another embodiment, for all 4-branch MIMO WTRUs that are co-scheduled within one subframe, the WTRU-specific pilot channels belonging to the same WTRU may share one common channelization code that is associated with that WTRU. The orthogonality of WTRU-specific pilot channels among different WTRUs may be achieved by applying different channelization codes to different WTRUs that are co-scheduled in the same subframe. This embodiment may be appropriate for the case where the number of the co-scheduled 4-branch MIMO WTRUs is not significant. The benefit of this embodiment is that four orthogonal pilot sequences are sufficient and there may be no need to signal the WTRU with pilot sequences that are used by the Node-B. A set of predefined pilot sequences may be used for all WTRUs. In such cases, while each pilot resource may consist of a pair of channelization code index and pilot sequence index, only the channelization code (and the transmission rank) may be dynamically signaled to the WTRU.

In another embodiment, the multiple WTRU dedicated pilot sequences may be transmitted by the Node-B and received by the WTRU using a combination of channelization codes and pilot sequences. Thus each pilot resource consists of a pair of channelization code index and pilot sequence index.

In an example of this embodiment, a fixed number of pilot sequences are defined and may be re-used for each channelization code. Thus the total number of pilot resources is given by the product of the number of channelization codes and the defined pilot sequences.

In another embodiment, the WTRU may receive a list of channelization code resources for dedicated pilots via RRC signaling. The pilot resources may then be organized for indexing in order of channelization code list and pilot sequence indices for each channelization code. Table 2 is an example of pilot resource indexing.

TABLE 2

| Channelization code | Pilot sequence | Pilot resource index |
|---|---|---|
| CC #0 | Sequence #0 | 0 |
|  | Sequence #1 | 1 |
|  | . . . | 2 |
|  | Sequence #($N_{seq}$ − 1) | 3 |
| CC #1 | Sequence #0 | 4 |
|  | Sequence #1 | 5 |
|  | . . . | 6 |
|  | Sequence #($N_{seq}$ − 1) | 7 |
| . . . | . . . | . . . |
| CC #($N_{cc}$ − 1) | Sequence #0 | ($N_{cc}$ − 1) * $N_{seq}$ + 1 |
|  | Sequence #1 | . . . |
|  | . . . | . . . |
|  | Sequence #($N_{seq}$ − 1) | $N_{cc}$ * $N_{seq}$ − 1 |

Table 2 shows an example of how pilot resources may be indexed when a combination of multiple channelization codes and pilot sequences are available. Here, $N_{cc}$ is the number of channelization codes signaled by the network and $N_{seq}$ is the maximum number of pilot sequences supported for a single channelization code. For example, the maximum number of pilot sequences supported for a single channelization code may be pre-defined in the specifications or configured by RRC signaling.

In one case of the embodiment described above, Nseq=1 and each channelization code may carry only 1 pilot sequence. In another case of the embodiment described above, Ncc=1 and thus all the pilots sequences may be carried using a single channelization code.

To reduce the signaling load associated to populating this list, a set of rules may be implemented such that the pilot resource indices are not necessarily signaled but rather inferred from the RRC signal ordered list. For example, the pilot resource indices may be inferred based on the order of the signaled pilot resource information. In one example, the WTRU is signaled a list of dedicated pilot channelization codes via RRC signaling. Based on the knowledge of Nseq, either fixed in the specifications or signaled by the network, (e.g., also via RRC signaling), the WTRU may determine the pilot resource indices in the order of the channelization code list received via RRC signaling.

Depending on the method used for transmission of a dedicated pilot, a number of approaches may be used for the WTRU to determine the pilot resource to use for the associated data transmission. It may be desirable to have a small signaling overhead while leaving sufficient flexibility to allocate the resources efficiently.

The methods for determining pilot information may be categorized as "implicit" and "explicit" indication methods. The methods may be used with any applicable dedicated pilot resource allocation method in any order or combination.

When using implicit indication methods, it may be assumed that no additional signaling is required and it may be assumed that the WTRU determines the pilot information for each data stream based on fixed rules.

In one particular method of implicit indication, the WTRU may be configured via RRC dedicated signaling with a specific dedicated pilot resource or a set of resources linked to one or more HS-SCCH resource or HS-SCCH number configured for dedicated pilot use. When the WTRU detects its high speed downlink shared channel (HS-DSCH) radio network transaction identifier (H-RNTI) on one of the configured HS-SCCH resources, the WTRU may determine the pilot information for the associated HS-PDSCH by association with the HS-SCCH configuration.

In an example of this method, the WTRU may be pre-configured with a set of pilot sequences. For example, the WTRU may be pre-configured with up to the maximum of layers supported. The WTRU may receive an RRC configuration for HSDPA with dedicated pilots. For each HS-SCCH resource indicated, the WTRU may also receive the associated pilot channelization code. In another example, the pilot channelization code may be indicated under the "HS-SCCH Channelization Code" IE in the "HS-SCCH Info" IE as specified in the RRC specifications. When the WTRU detects its H-RNTI in the HS-SCCH, the WTRU may determine the pilot resources by association with the HS-SCCH number or resource. More specifically, when the WTRU detects its H-RNTI on a specific HS-SCCH resource, the WTRU may determine the associated HS-SCCH number from the IE configuration index associated with that HS-SCCH resource. The number of pilots may be determined explicitly or based on a combination of the number of transport blocks or codewords and associated layers as signaled on the HS-SCCH, for example. Hereinafter transport block and codewords are used interchangeably.

In another example of this method, the WTRU may be pre-configured with a set of pilot resources, which may be indexed sequentially (for example, see Table 2). The WTRU may receive an RRC configuration for HSDPA with dedicated pilots. For each HS-SCCH resource indicated, the WTRU may also receive a base pilot resource index. When the WTRU detects its H-RNTI in the HS-SCCH, the WTRU may determine the pilot resource information, (channelization code, pilot sequences), by using the pilot resource index associated to the HS-SCCH number or resource in the configured look-up table.

Using the implicit approach with the HS-SCCH number/resource may have the advantage of the WTRU knowing the pilot resource before starting to receive the HS-PDSCH.

When using explicit methods, the WTRU may be indicated explicitly by the Node-B which dedicated pilot resource(s) to use for the associated HS-PDSCH transmission.

In an example of this method, the WTRU may receive the dedicated pilot resource information in part 1 of the HS-SCCH. For example, the dedicated pilot resource information may consist of one or more indices to pilot resources. In another example, the dedicated pilot resource information may consist of a single index indicating a dedicated pilot channelization code or an index to a dedicated pilot channelization code, in which case the WTRU may determine the set of dedicated pilots resources to use by using a known pre-defined set of pilot sequences and the number of layers as signaled or determined from other fields in the HS-SCCH. This may be appropriate, for example, when a single channelization code per WTRU is used for dedicated pilot transmission. Alternatively, this dedicated pilot resource information may consist of a single index indicating, for example, a base pilot resource index, in which case the WTRU may determine the set of dedicated pilot resources to use via a configured look-up table and the number of layers determined for example using the other fields in the HS-SCCH.

In the following example, up to 4 pilots may be needed for rank-4 transmission, up to 4 sets of pilot information need to be signaled. This may be achieved for example by signaling a starting index of a set of orthogonal pilot sequences, and the WTRU may derive the numbers or indices of the rest of pilot sequences by reading the rank information signaled from the Node-B. This approach may require that the Node-B use a consecutive pilot index or that a fixed rule is defined for the WTRU to determine the pilot indices, and that both the WTRU and the Node-B are aware of the list of pilot indices. Alternatively, the Node-B may signal both the starting index of a set of orthogonal pilot sequences and the number of the orthogonal pilot sequences to be used by that WTRU. In this case, the number of the orthogonal pilot sequences may also be used as a rank indication. Therefore, there may not be a need for the Node-B to signal additional rank information to the WTRU.

Figure 13:
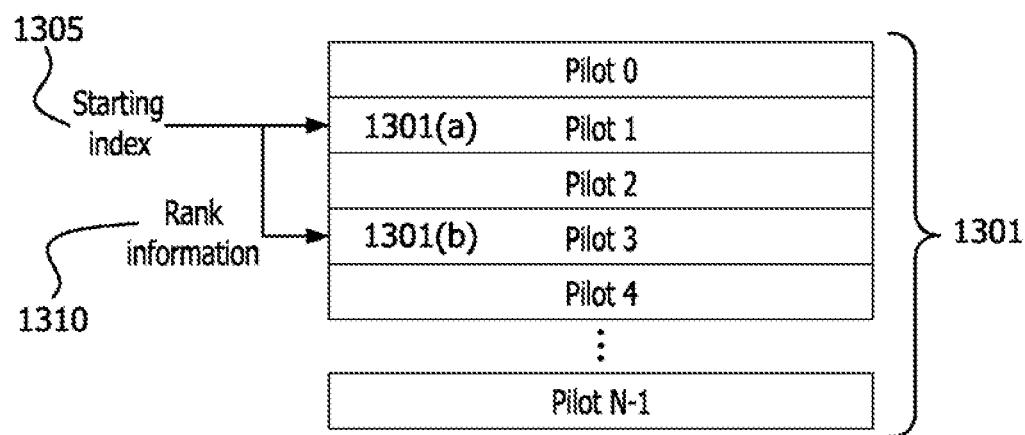
FIG. 13 is an example of pilot indexing with rank indication.

FIG. 13 is an example of pilot indexing with rank indication. FIG. 13 includes pilot 1301. A starting point 1305 indicates starting with pilot 1301(a). The rank information 1310 is used by the WTRU for demodulation and indicates that pilots 1301(a) through 1301(b) should be used for the demodulation.

FIG. 13 illustrates an example where N is the maximum available number of orthogonal pilot resources. In the example, the WTRU may indicate a starting index pointing to Pilot #1 and a rank information of 3 layers leading the WTRU to use pilot indices #1-3 for demodulation of the three layers. A wrap-around of the indices may also be used. This example may be extended to support more than rank-4 transmission where the Node-B and the WTRU support a larger number of antennas.

After receiving the HS-SCCH, the WTRU may determine the number of transport blocks in the associated HS-PDSCH, and the number of layers for each transport block. The number of layers for each transport block may be determined by a combination of fixed rules and explicit information signaled on the HS-SCCH.

In one example, each transport block may be limited to a single layer by the specifications. Then, there is a one-to-one mapping between the number of transport blocks and the number of layers. The WTRU may receive the information on the number of transport blocks or number of layers in the HS-SCCH (preferably in part 1).

The WTRU may then associate each transport block, with the information signaled in the HS-SCCH, to a given layer in order of the dedicated pilot index, (for example as configured via RRC signaling or in the specifications). For example, the WTRU may be configured with a set of pilot resources, for example via RRC configuration. In one particular example, the pilot resource configuration may consist of a starting index to a table of pilot resources. Then a given transmission time interval (TTI) the WTRU may be indicated via the HS-SCCH that the HS-PDSCH carries N layers. The WTRU may further determine the association between each layer and pilot based on the number of layers and the pilot resource configuration. For example, layer 1 may be associated to the first pilot in the set, layer 2 to the second pilot in the set and so forth.

In another example, each transport block may be carried using more than one layer. The actual transport configuration may be restricted by the specifications.

Table 3 is an example of transport blocks to number of layer mapping with up to 4 simultaneous transport blocks.

TABLE 3

| Config # | Nb of layers | Nb of TB | Nb of layers for each TB |
|---|---|---|---|
| 1 | 1 | 1 | 1 |
| 2 | 2 | 1 | 2 |
| 3 |   | 2 | 1, 1 |
| 4 | 3 | 1 | 3 |
| 5 |   | 2 | 2, 1 |
| 5A |   | 3 | 1, 1, 1 |
| 6 | 4 | 1 | 4 |
| 7 |   | 2 | 3, 1 |
| 8 |   | 2 | 2, 2 |
| 8A |   | 3 | 2, 1, 1 |
| 8B |   | 4 | 1, 1, 1, 1 |

Table 3 includes a table that lists a number of possible transport configurations or transport blocks to number of layer mapping with up to 4 simultaneous transport blocks. In practice, the set of configurations supported may be smaller than what is listed in Table 3.

In one practical example or configuration reduction, the WTRU may be limited to two transport blocks at each TTI, and each transport block may thus be carried by up to two layers. Table 4 is an example of a reduced configurations set for up to two simultaneous transport blocks with up to 4 layers.

TABLE 4

| Config # | Nb of layers | Nb of TB | Nb of layers for each TB $L_1, L_2$ |
|---|---|---|---|
| 1 | 1 | 1 | 1, 0 |
| 2 | 2 | 2 | 1, 1 |
| 3 | 3 | 2 | 1, 2 |
| 4 | 4 | 2 | 2, 2 |

Table 4 illustrates an example of this concept, derived from Table 3, where only 4 transmission configurations are supported. The number of layers for the first and second transport block ($L_1$, $L_2$, respectively) is shown in the last column.

In another example, up to two transport blocks may be multiplexed into a single code word. In this example, a codeword is not necessarily identical to a transport block. Codewords containing a single transport block may be transmitted with a single layer, whereas codewords containing two transport blocks may be transmitted using two layers. In the context of 4DL-MIMO, the WTRU may be configured to receive up to 2 codewords.

In this example, the WTRU may be indicated the number of transport blocks or codewords and number of layers in the HS-SCCH, preferably in part 1. The WTRU may then associate each transport block to one or two layers in the order of dedicated pilot index. This association may be carried out by the WTRU using a table lookup, for example.

In one example, the WTRU may determine the number of transport blocks based on the indicated number of codewords and number of layers in the HS-SCCH, preferably part 1 using a fixed set of rules.

More generally, it may be assumed that the WTRU is configured with a set of dedicated pilots that may be indexed. This indexing may be achieved using, for example, any one or a combination of the methods described above. Then let $p_{l,k}$ be the dedicated pilot index associated to layer index k=0, 1, . . . , $N_L$ of transport block index l=0, 1, . . . , $N_{tb}$, where $N_L$ and $N_{tb}$ are the maximum number of layers per transport block and the maximum number of simultaneous transport blocks for a subframe. Further it may be assumed that the WTRU dynamically receives a dedicated pilot base index offset b.

In one embodiment, the pilots may be associated in order of transport block first and then layers for each transport block. For example, when two transport blocks are transmitted, each with two layers, the first and second dedicated pilots for that WTRU may be associated with the first and second layers of the first transport block, respectively, and the third and fourth dedicated pilots may be associated with the first and second layers of the second transport block, respectively.

In this example approach, the dedicated pilot index associated to the layer l or transport block k may be expressed as:

$$p_{l,k} = b + l + N_L \times k.$$ Equation (1)

This expression may imply that the maximum number of layers is allocated to the first block before another transport block can be allocated a layer. Alternatively, the number of the layer for transport block k may be expressed as $N_{L,k}$, and the following expression for the pilot index does not suffer from that restriction:

$$p_{l,k} = b + l + \sum_{j=0}^{k-1} N_{L,j}$$ Equation (2)

Alternatively in another approach, the pilots may be associated first in order of layers for each transport block. For example, when two transport blocks are transmitted, each with two layers, the first and second dedicated pilots for that WTRU may be associated with the first layer of the first and second transport block, respectively. The third and fourth dedicated pilots may be associated with the second layer of the first and second transport block, respectively.

Similarly in this example approach, the dedicated pilot index associated to the layer l or transport block k may be expressed as:

$$p_{l,k} = b + k + N_{tb} \times l.$$ Equation (3)

This expression may ensure that the layers are allocated to each TB in turn. Finally, for convenience, wrap around of the dedicated pilot indices may also be used, and in such cases the actual index $p_{l,k}'$ may be determined via a modulo operation, for example as follows:

$$p_{l,k}' = p_{l,k} \bmod N_{tb} \times N_L.$$ Equation (4)

Figure 14:
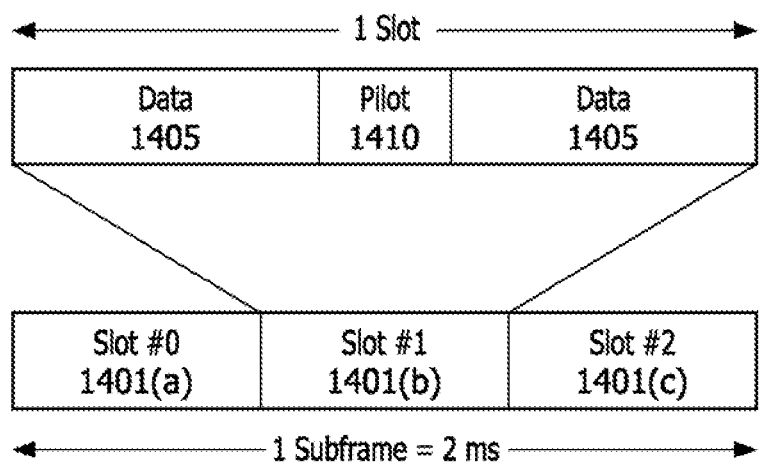
FIG. 14 is an example of time multiplexing WTRU-specific pilot with a high speed-physical downlink shared channel (HS-PDSCH)

In another embodiment, the WTRU-specific pilots may be time-multiplexed with an HS-PDSCH channel. FIG. 14 is an example of time multiplexing WTRU-specific pilot with HS-PDSCH. FIG. 14 includes slot #0 1401(a), slot #1 1401(b), and slot #2 1401(c). Slot #1 1401(b) is expanded to show that it includes data 1405 and a pilot 1410. The pilot 1410 is inserted into the middle of slot #1 1401(b). FIG. 14 illustrates an example where the pilots are inserted into the middle of each slot of an HS-PDSCH subframe.

Figure 15:
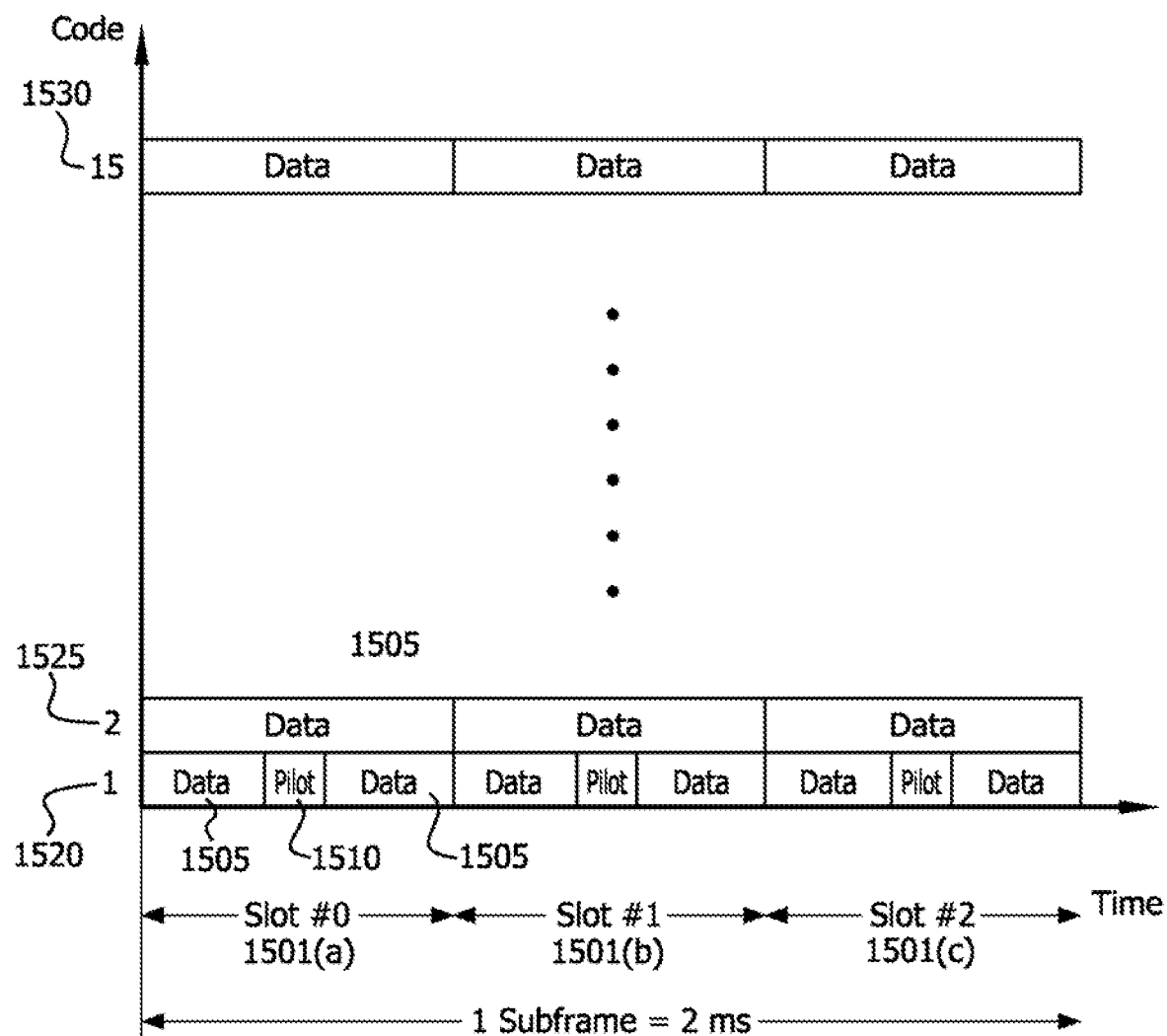
FIG. 15 is an example of time multiplexing WTRU-specific pilot with HS-PDSCH on one channelization code.

Since multicode transmission is possible, where multiple channelization codes may be assigned to a single WTRU for HS-PDSCH transmission, the WTRU-specific pilots may need to be transmitted on one of the assigned channelization codes, as shown in FIG. 15, while the HS-PDSCH channels on other assigned channelization codes are transmitted in the legacy way. FIG. 15 is an example of time multiplexing WTRU-specific pilot with HS-PDSCH on one channelization code. FIG. 15 illustrates channelization code #1 1520 to code #15 1530. In channelization code #1 1520, slots #0 1501(a), #1 1501(b), and #2 1501(c) include pilot 1510 inserted between data 1505 of an HS-PDSCH subframe. Channelization code #2 1525 to code #15 1530 only include data 1505 in each HS-PDSCH subframe.

Figure 16:
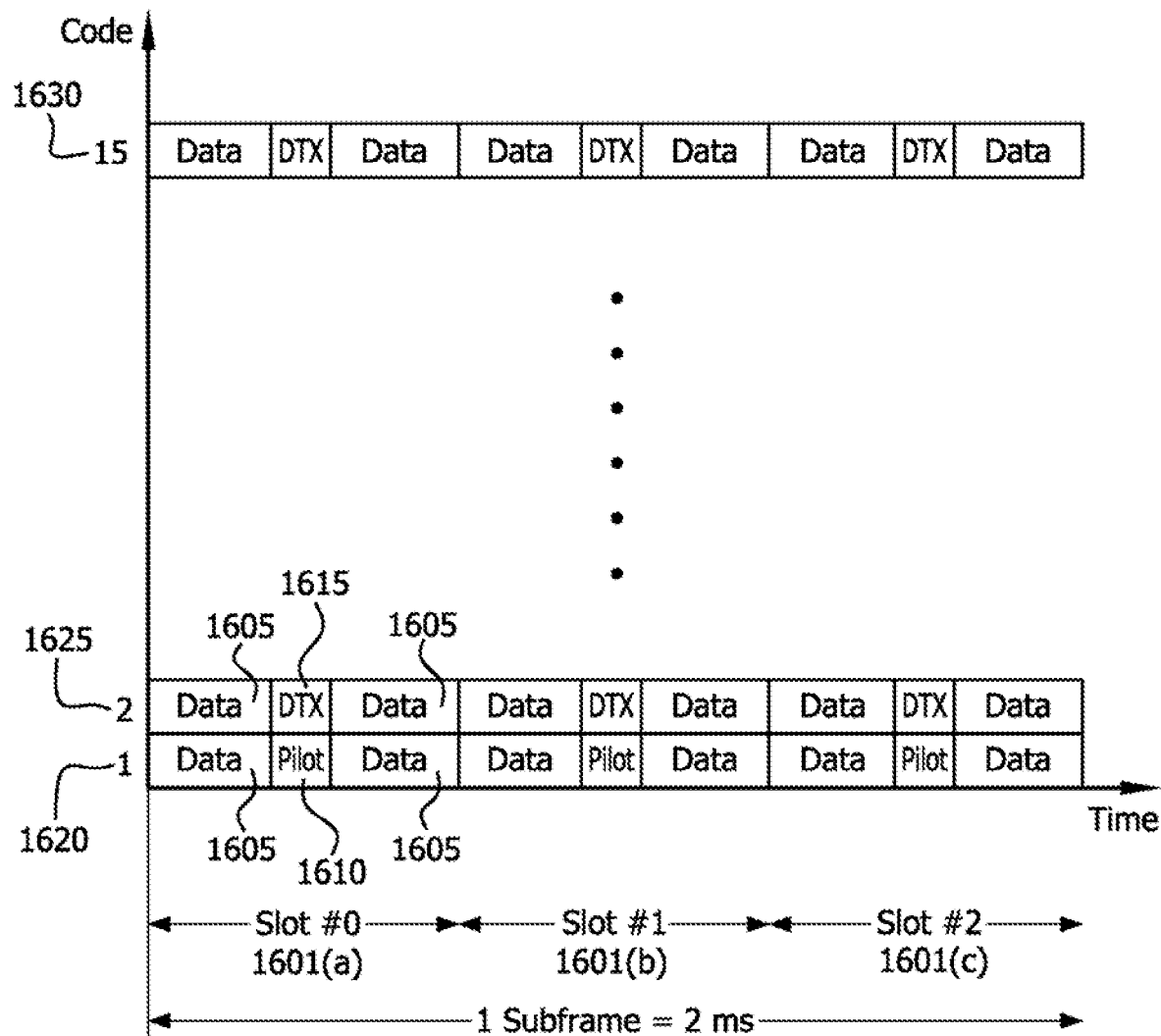
FIG. 16 is an example of time multiplexing WTRU-specific pilot with HS-PDSCH on one channelization code and discontinuously transmitting the pilot portion of HS_PDSCHs on all other channelization codes.

Alternatively, the WTRU-specific pilots may be transmitted on one of the assigned channelization codes, and the pilot portion of HS-PDSCHs on other assigned channelization codes are not transmitted or discontinuously transmitted (DTXed), as shown in FIG. 16. FIG. 16 is an example of time multiplexing WTRU-specific pilot with HS-PDSCH on one channelization code and discontinuously transmitting the pilot portion of HS_PDSCHs on all other channelization codes. FIG. 16 illustrates channelization code #1 1620 to code #15 1630. In channelization code #1 1620, slots #0 1601(a), #1 1601(b), and #2 1601(c) include pilot 1610 inserted between data 1605 of an HS-PDSCH subframe. Channelization code #2 1625 to code #15 1630 includes a discontinuous transmission (DTX) 1615 inserted between data 1605 in each HS-PDSCH subframe.

Figure 17:
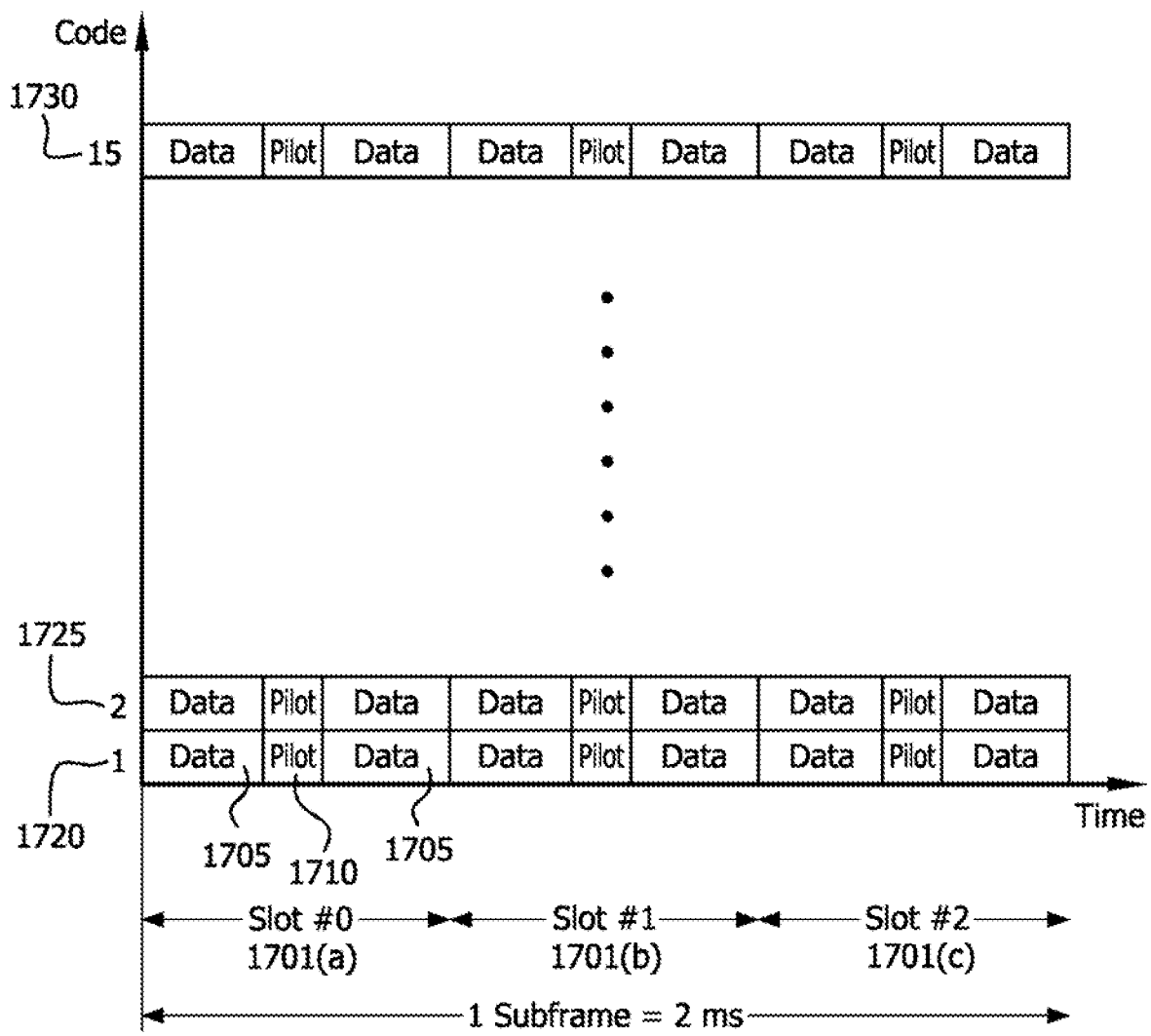
FIG. 17 is an example of time multiplexing WTRU-specific pilot with HS-PDSCH on all assigned channelization codes (up to 15)

Alternatively, the WTRU-specific pilot may be time multiplexed with the HS-PDSCH on each assigned channelization code, as shown in FIG. 17. FIG. 17 is an example of time multiplexing WTRU-specific pilot with HS-PDSCH on all assigned channelization codes (up to 15). FIG. 17 illustrates channelization code #1 1720 to code #15 1730. In channelization code #1 1720 to code #15 1730, slots #0 1701(a), #1 1701(b), and #2 1701(c) include pilot 1710 inserted between data 1705 of an HS-PDSCH subframe.

Alternatively, the pilot symbols may be spread uniformly across the radio slot in the HS-PDSCH on one code or over all channelization codes. Any number of pilot symbols ($N_{pilot}$) may be inserted in a given HS-PDSCH radio slot.

Table 5 is an example of traffic-to-pilot ratio for various numbers of pilot symbols per radio slot.

TABLE 5

| Nb pilots symbols/slot | T/P (dB) |
| --- | --- |
| 1 | 22.0 |
| 2 | 19.0 |
| 3 | 17.2 |
| 4 | 15.9 |
| 5 | 14.9 |
| 6 | 14.1 |
| 7 | 13.4 |
| 8 | 12.8 |
| 9 | 12.2 |
| 10 | 11.8 |
| 11 | 11.3 |
| 12 | 10.9 |
| 13 | 10.5 |
| 14 | 10.2 |
| 15 | 9.9 |
| 16 | 9.5 |
| 17 | 9.2 |
| 18 | 9.0 |
| 19 | 8.7 |
| 20 | 8.5 |

Table 5 shows the resulting traffic-to-pilot power ratio (T/P) for each value of number of pilots (for 1 radio slot) in a spreading factor (SF)=16 HS-PDSCH. Nb pilot symbols, 4, 5, 6, 8, 9, 12, and 15 are entries that correspond to one example subset of values that may be used. These values were obtained by finding the entries corresponding to 10, 11, 12, . . . 16 dB T/P as it is currently defined for the uplink. The values are for a single radio-slot for a single code. To achieve the listed T/P the corresponding number of pilots must be inserted on each channelization code and for all slots in the subframe.

As it may be more convenient in terms of hardware processing to have all the pilot symbols carried on a single channelization code (as illustrated by FIG. 17), the number of pilot symbols present on the channelization code carrying pilot may depend on the actual number of HS-PDSCH codes being used for the transmission. In one method, the WTRU may be configured, for example, via RRC signaling for a specific T/P. Then, assuming the same pilot power and modulation scheme for all symbols in a HS-PDSCH code, the WTRU may determine the actual number of pilots used.

For example, assuming that $N_{ch}$ HS-PDSCH codes are being used (Nch=1, ..., 15), then the WTRU may determine the number of pilot symbols $N_{pilot}$ (for one radio slot) on the HS-PDSCH code carrying the pilot symbols via this expression:

$$N_{piolt} = \left\lfloor \frac{N_{ch} \times 160}{1 + 10^{TP/10}} \right\rfloor, \quad \text{Equation (5)}$$

where 160 corresponds to the number of SF=16 symbols in one radio slot, and TP is the T/P expressed in dB. While a floor operation is indicated in Equation (5), a ceiling or rounding up to the closest integer may also be used to determine the number of pilot symbols.

The WTRU may also be configured with a fixed table indicating the number of pilot symbols for each possible configuration of T/P and number of HS-PDSCH codes being transmitted. Table 6 is an example table of the number of pilots for each T/P and number of HS-PDSCH codes configuration.

following approach may be used to construct a set of orthogonal pilot bit sequences with bit length of 40:

$$P = \begin{bmatrix} A & A & B & C \\ -B & -C & A & A \\ -A & A & C & -B \\ -C & B & -A & A \end{bmatrix}; \quad \text{Equation (6)}$$

where $$A = \begin{bmatrix} -1 & 1 & 1 & 1 & 1 \\ 1 & -1 & 1 & 1 & 1 \\ 1 & 1 & -1 & 1 & 1 \\ 1 & 1 & 1 & -1 & 1 \\ 1 & 1 & 1 & 1 & -1 \end{bmatrix}; \quad \text{Equation (7)}$$

$$B = \begin{bmatrix} 1 & -1 & 1 & 1 & -1 \\ -1 & 1 & -1 & 1 & 1 \\ 1 & -1 & 1 & -1 & 1 \\ 1 & 1 & -1 & 1 & -1 \\ -1 & 1 & 1 & -1 & 1 \end{bmatrix}; \quad \text{Equation (8)}$$

and $$C = \begin{bmatrix} 1 & 1 & -1 & -1 & 1 \\ 1 & 1 & 1 & -1 & -1 \\ -1 & 1 & 1 & 1 & -1 \\ -1 & -1 & 1 & 1 & 1 \\ 1 & -1 & -1 & 1 & 1 \end{bmatrix}, \quad \text{Equation (9)}$$

TABLE 6

|   |    | Number of HS-PDSCH codes | | | | | | | | | | | | | | |
|---|----|---|---|---|---|---|---|---|---|---|---|---|---|---|---|---|
|   |    | 1 | 2 | 3 | 4 | 5 | 6 | 7 | 8 | 9 | 10 | 11 | 12 | 13 | 14 | 15 |
| T/P (dB) | 10 | 14 | 29 | 43 | 58 | 72 | 87 | 101 | 116 | 130 | 145 | 160 | X | X | X | X |
|  | 11 | 11 | 23 | 35 | 47 | 58 | 70 | 82 | 94 | 105 | 117 | 129 | 141 | X | X | X |
|  | 12 | 9 | 18 | 28 | 37 | 47 | 56 | 66 | 75 | 85 | 94 | 104 | 113 | 123 | 132 | 142 |
|  | 13 | 7 | 15 | 22 | 30 | 38 | 45 | 53 | 61 | 68 | 76 | 83 | 91 | 99 | 106 | 114 |
|  | 14 | 6 | 12 | 18 | 24 | 30 | 36 | 42 | 49 | 55 | 61 | 67 | 73 | 79 | 85 | 91 |
|  | 15 | 4 | 9 | 14 | 19 | 24 | 29 | 34 | 39 | 44 | 49 | 53 | 58 | 63 | 68 | 73 |
|  | 16 | 3 | 7 | 11 | 15 | 19 | 23 | 27 | 31 | 35 | 39 | 43 | 47 | 50 | 54 | 58 |

Table 6 shows an example of such a configuration table, (obtained using Equation (5)). The entries designated with an "X" may require more pilot symbols than what is available using a single code, and thereby may not be used. Optionally, for those entries, the WTRU may be configured to transmit using the maximum number of pilot symbols (i.e., 160).

The network may also signal the power ratio between the WTRU-specific pilot channel and the data channel (HS-PDSCH) to the WTRU. This may be carried out, for example, via RRC signaling or other means. To assist CQI evaluation at the WTRU, one or any combination of the following power ratios may be signaled from the Node-B to the WTRU via RRC signaling: the ratio between common pilot power and WTRU specific pilot power, the ratio between WTRU specific pilot power and data power, and the ratio between common pilot power and data power.

The construction of orthogonal pilot sequences for WTRU-specific pilot channels may depend on the spreading factor selected. If the spreading factor is 256, the pilot sequences shown in Table 1 for a common pilot channel may be reused. If a spreading factor of 128 is chosen, the where 1 is mapped to binary bits 00 and −1 is mapped to binary bits 11. The binary bits may be used for modulation symbol mapping.

If the spreading factor is 4, a set of four orthogonal pilot symbols with length of 4 may be defined as follows:

$$P_4 = \begin{bmatrix} 1 & 1 & 1 & 1 \\ 1 & 1 & -1 & -1 \\ 1 & -1 & 1 & -1 \\ 1 & -1 & -1 & 1 \end{bmatrix}, \quad \text{Equation [10]}$$

where each row represents one pilot pattern and 1 is mapped to binary bits 00 and −1 is mapped to binary bits 11. Consequently, the length of the corresponding pilot bit sequence is 8. This 4-symbol long pilot may be used to construct an 8-symbol pilot, which is defined as follows:

$$P_8 = [P_4 P_4]. \quad \text{Equation (11)}$$

A network may also take advantage of multiple downlink transmit antennas to increase the coverage of control channels. Further, pre-coding or beamforming may be applied to the HS-SCCH in order to increase HS-DSCH coverage, reduce interference, and use less power resources for that particular control channel.

Methods for the WTRU to receive, demodulate, and decode the precoded control channel information, for example, HS-SCCH, are described in the context of both pre-coded pilot and common pilot scenarios below. Although the methods are described in the context of the WTRU receiving the HS-SCCH, the methods may also apply to other channels or other technologies.

In one example, the WTRU may be configured to receive the HS-SCCH using a pre-coded pilot. As a result, the amount of pilot power used by the network may be dynamically adapted and optimized. In a conventional system, the HS-SCCH may be demodulated using the common pilot and the WTRU is aware of the spreading code and pilot sequence to use for demodulation. With pre-coded pilots, a new set of pilot resources may need to be used for demodulation purposes. Methods for use in the WTRU to determine which pilot resource (i.e., channelization code, pilot sequence) to use are described herein.

In a first set of methods, the WTRU is configured with a specific pilot resource, or set of resources for decoding the HS-SCCH and, optionally, the associated HS-PDSCH. In one example, the WTRU may receive the configuration via RRC signaling. Then, the WTRU may attempt to demodulate and decode the HS-SCCH using the configured pilot resource.

From a resource allocation perspective, the RNC may allocate a different pilot resource to every WTRU. However, this approach may consume a large number of channelization codes and may be inefficient as only a fraction of WTRUs are expected to receive HS-DSCH transmission on any given TTI.

In order to improve the efficiency of the pilot resource allocation, it may be advantageous to allocate the same pilot resource or set of pilot resources to more than one WTRU. Each pilot resource may only be used for a single WTRU at a time. The WTRU may use each pilot resource for channel estimation of a different layer. The pilot resource-layer association may be configurable or implicit, for example, based on fixed rules known by both the WTRU and Node B.

In order to allow as many WTRUs as possible to be scheduled with an HS-SCCH, the same set of pilot resources may be allocated to more than one WTRU with a potentially different pilot to layer association for each WTRU. This may provide the Node B with the additional flexibility to potentially schedule more than one WTRU, for example, MU-MIMO operation, from the same pilot resource set in a single TTI provided that the actual pilot resources used for each WTRU are not the same simultaneously.

Table 7 is an example of potential pilot resource allocation to multiple WTRUs.

TABLE 7

| Pilot resource | Pilot resource associated layer | | | |
|---|---|---|---|---|
| | $UE_1$ | $UE_2$ | $UE_3$ | $UE_4$ |
| P0 | L0, HS-SCCH | L3 | L2 | L1 |
| P1 | L1 | L0, HS-SCCH | L3 | L2 |
| P2 | L2 | L1 | L0, HS-SCCH | L3 |
| P3 | L3 | L2 | L1 | L0, HS-SCCH |

Each WTRU may be configured with a set of pilot resources (P0 to P3 in this example) and each pilot resource may be associated with a specific layer. In this example, the layers are L0, . . . , L3 and the HS-SCCH is further associated with L0. While each WTRU is configured with the same set of pilot resources, each resource may be associated with a different layer.

The number of pilot resources and WTRUs may differ than what is shown in Table 7. For example, the pilot-resource to layer association may not be mutually exclusive.

To further improve the reliability of HS-SCCH reception, the HS-SCCH may be placed on the layer that has the best signal quality. When a Node B performs association of pilot resource to the layers, the Node B may be further required to apply the pilot resource associated to HS-SCCH to the precoding weight that has the best CQI report or another type of performance measure. For example, in Table 7, $WTRU_1$ may assign P0 to its best layer and $WTRU_4$ may have P3 transmitted on its best layer.

In a second set of methods, the WTRU may be configured with a set of HS-SCCH codes to monitor and there may be one or more associated pilot resources for each HS-SCCH code. The WTRU attempts to decode each configured HS-SCCH code using the associated pilot for demodulation and channel filtering.

Because the number of pilot resources to be reserved by the network for control-channel demodulation purposes is of the same order as the number of HS-SCCH codes, the pilot resource used for the associated HS-PDSCH may be different than the pilot resource used for the HS-SCCH. As a result, the Node B may transmit the HS-SCCH with a different precoding weight.

Figure 18:
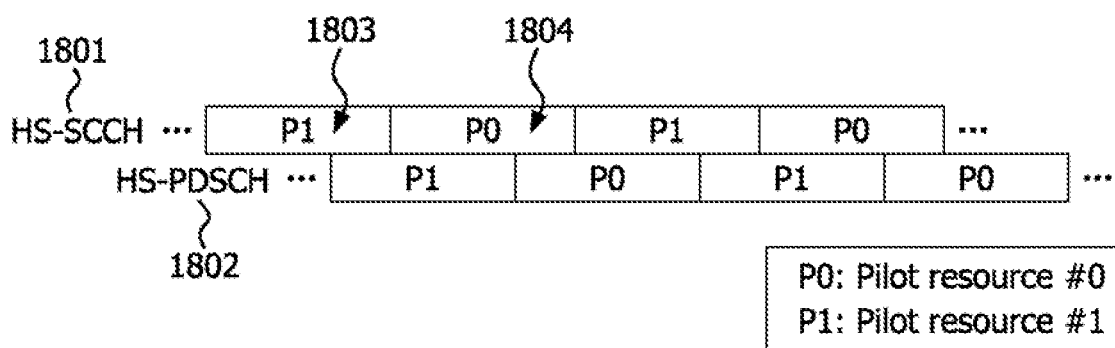
FIG. 18 is an example of pilot resource allocation for demodulation of HS-SCCH and HS-PDSCH.

FIG. 18 is an example of pilot resource allocation for demodulation of HS-SCCH and HS-PDSCH. FIG. 18 includes HS-SCCH 1801 and HS-PDSCH 1802. Each channel 1801 and 1802 includes pilot resources #0 and #1. Pilot resource #0 corresponds to P0 1804 and pilot resource #1 corresponds to P1 1803.

The pilot resource used for the associated HS-PDSCH may also be the same as the pilot resource used for the HS-SCCH. Because the HS-SCCH and associated HS-PDSCH overlap in time, the same pilot resource may not be used in adjacent TTIs. This may be achieved by allocating two sets of pilot resources for each HS-SCCH code and using them in time alternation. Provided there is an appropriate configuration, this may prevent pilot resource collision. The WTRU may be configured with two sets of pilot resources for each HS-SCCH, and the WTRU may use them in time-alternation for demodulating the HS-SCCH and the associated HS-PDSCH, if present, according to a fixed rule. FIG. 18 shows that P0 and P1 are the two pilot resources for a specific HS-SCCH code.

Figure 19:
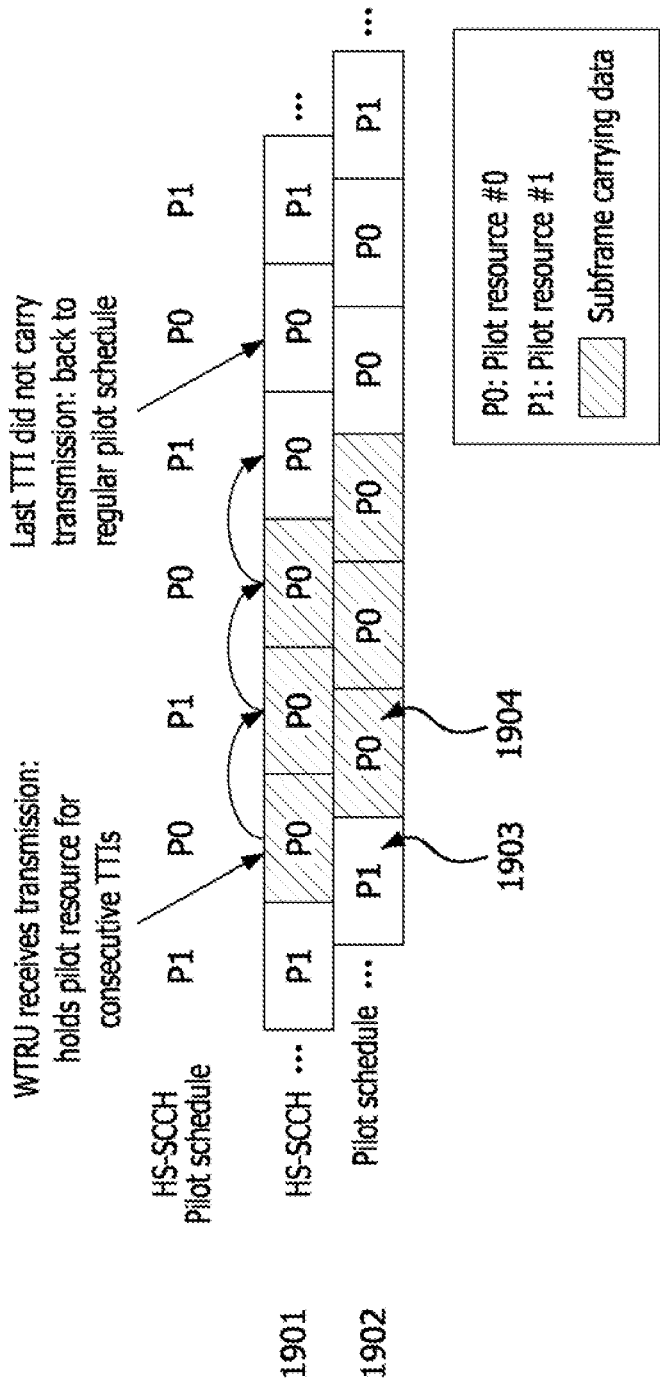
FIG. 19 shows a time multiplexing WTRU-specific pilot with HS-PDSCH on one channelization code.

FIG. 19 is an example of pilot resource monitoring in the presence of transmission. FIG. 19 includes HS-SCCH 1901 and HS-PDSCH 1902. Each channel 1901 and 1902 includes pilot resources #0 and #1. Pilot resource #0 corresponds to P0 1904 and pilot resource #1 corresponds to P1 1903.

Additional rules may be used to simplify the WTRU processing. For example, when the WTRU receives an actual HS-SCCH with associated data on the HS-PDSCH, the WTRU may use the same pilot resource for channel estimation on subsequent consecutive HS-DSCH transmissions. This may simplify the WTRU channel estimation procedure as it may not need to track two different channel estimates (from different pilot resources) during subsequent transmission. Accordingly, when the WTRU decodes its H-RNTI successfully on the HS-SCCH, the WTRU may use the same pilot resource for demodulating the HS-SCCH on the next TTI. If the next TTI does not carry a transmission for that WTRU, the WTRU may revert to the predefined pilot resource schedule on the following TTI.

In another method, the WTRU may be configured with a set of pilot resources for HS-SCCH monitoring and may blindly demodulate the HS-SCCH. The WTRU may attempt to decode each configured HS-SCCH with each pilot resource configured until the WTRU detects its H-RNTI or until the WTRU has exhausted the search.

In another method, the WTRU may be configured to monitor a broadcast channel indicating the pilot resource to use for a particular HS-SCCH code.

In a common pilot scenario, the WTRU may be configured to estimate the channel based on a set of common pilot channels. This is similar to conventional MIMO operations from Release 7 where the Node B transmits pre-coded HS-PDSCH channels and indicates an index to the pre-coding weight to the WTRU. However, here, the HS-SCCH may also be pre-coded by the Node B in order to improve the cell coverage.

Because it may be preferred from the demodulation performance point-of-view that the WTRU is aware of a priori, the actual weights used for HS-SCCH pre-coding, indicating the weights on the HS-SCCH itself, may not be sufficient.

In a first method, the WTRU may be configured with a set of precoding weights that may be used for HS-SCCH precoding. In one example, the WTRU may blindly determine the HS-SCCH pre-coding weights by attempting to decode the HS-SCCH with each precoding weight in the configured set. Optionally, the precoding weight indicated on the HS-SCCH for HS-PDSCH may be the same as the HS-SCCH precoding weight. The WTRU may then make correction to its channel estimate if its precoding weight estimate for HS-SCCH is wrong in the first place.

In a second method, the WTRU may be configured with a set of precoding weights and one or more parameters describing a schedule for the HS-SCCH precoding weights. In each HS-SCCH subframe, the WTRU may determine the scheduled HS-SCCH precoding weights based on the configured parameters and potentially the connection frame number (CFN). The WTRU may use these weights to attempt decoding the HS-SCCH. Here, the WTRU may use different precoding weights, for example, the ones indicated in the decoded HS-SCCH, to demodulate the associated HS-PDSCH.

In a third method, the WTRU may also be configured with a set of precoding weights. The WTRU may determine the actual weights used for a particular HS-SCCH subframe and HS-SCCH code based on a separate signal broadcast from the Node B. This new signal carries the precoding weight index for each configured HS-SCCH code.

In a fourth method, the HS-SCCH may be precoded according to the precoding weight used in the last sub-frame of HS-PDSCH that was transmitted to this WTRU. The WTRU may be required to store the used precoding weight in the memory and use it when decoding the HS-SCCH that comes next. Here, the WTRU may be allowed to use same or different precoding weights, for example, the ones indicated in the decoded HS-SCCH, to demodulate the associated HS-PDSCH. The HS-SCCH may be precoded by using the same precoding weight carried for the associated HS-PDSCH sub-frame at an initial sub-frame of a downlink transmission or if the WTRU has been idling for an excessive period of time. Here, the first sub-frame of HS-SCCH may be decoded by blind detection of the precoding weight.

Methods for control information processing may include methods to signal downlink control information for a maximum of 2 codewords or 4 codewords.

For signaling downlink control information for a maximum of 2 codewords, a non-codebook-based MIMO transmission structure may not require the WTRU to know the precoder applied at the transmitter for data demodulation. On the other hand, the WTRU may need such knowledge to demodulate and decode for a codebook-based MIMO transmission. Signaling methods for both codebook-based and non-codebook-based MIMO transmissions are discussed below.

As previously described, no precoding information may need to be signaled to the WTRU. Therefore, the precoding weight information field xpwipb1, xpwipb2 of the existing HS-SCCH type 3 may be reused for other purposes. For example, combined with modulation scheme and number of transport blocks information field xms1, xms2, xms3, the precoding weight information field may be used to signal rank information up to rank 4.

Table 8 is a first example mapping of $X_{pwi}$, $X_{ms}$.

TABLE 8

| xpwipb, 1, xpwipb, 2 | xms, 1, xms, 2, xms, 3 | Modulation for primary transport block | Modulation for secondary transport block | Number of transport blocks |
|---|---|---|---|---|
| 00: rank 2 01: rank 3 10: rank 4 | 111 | 16QAM | 16QAM | 2 |
| 00: rank 2 01: rank 3 10: rank 4 | 110 | 16QAM | QPSK | 2 |
| If xccs, 7 = 1, then 00: rank 2 01: rank 3 10: rank 4 Otherwise, n/a | 101 | 64QAM | Indicated by xccs, 7 | Indicated by xccs, 7 |
| n/a | 100 | 16QAM | n/a | 1 |
| 00: rank 2 01: rank 3 10: rank 4 | 011 | QPSK | QPSK | 2 |
| 00: rank 2 01: rank 3 10: rank 4 | 010 | 64QAM | 64QAM | 2 |
| 00: rank 2 01: rank 3 10: rank 4 | 001 | 64QAM | 16QAM | 2 |
| n/a | 000 | QPSK | n/a | 1 |

As one example, Table 8 shows how to use existing weight information field xpwipb and modulation scheme and number transport blocks information field xms to signal the rank information. The weight information field xpwipb may be used to signal rank information (rank 2, 3, or 4) when the number of transport blocks is two. There may be no change on part 2 of the existing HS-SCCH type 3 channel. The benefit of this example is that at the WTRU side there may be very few changes on the decoding of HS-SCCH type 3 channel. The only change may be the reinterpretation of the xpwipb field when 4-branch DL MIMO is configured.

Since there are a total of 21 different combinations of modulation scheme and rank, 5 bit information may be sufficient to convey all of them. Table 9 is a second example mapping of $X_{pwi}$, $X_{ms}$.

TABLE 9

| xpwipb, 1, xpwipb, 2 | xms, 1, xms, 2, xms, 3 | Modulation for primary transport block | Modulation for secondary transport block | Number of transport blocks | rank |
|---|---|---|---|---|---|
| 00 | 111 | 16QAM | 16QAM | 2 | 2 |
| 01 | | | | | 3 |
| 10 | | | | | 4 |
| 00 | 110 | 16QAM | QPSK | 2 | 2 |
| 01 | | | | | 3 |
| 10 | | | | | 4 |
| 00 | 101 | 64QAM | QPSK | 2 | 2 |
| 01 | | | | | 3 |
| 10 | | | | | 4 |
| 11 | 101 | 64QAM | n/a | 1 | 1 |
| n/a | 100 | 16QAM | n/a | 1 | 1 |
| 00 | 011 | QPSK | QPSK | 2 | 2 |
| 01 | | | | | 3 |
| 10 | | | | | 4 |
| 00 | 010 | 64QAM | 64QAM | 2 | 2 |
| 01 | | | | | 3 |
| 10 | | | | | 4 |
| 00 | 001 | 64QAM | 16QAM | 2 | 2 |
| 01 | | | | | 3 |
| 10 | | | | | 4 |
| n/a | 000 | QPSK | n/a | 1 | 1 |

As another example shown in Table 9, both xpwipb and xms fields may be used, 5-bit in total, to signal rank and modulation scheme and consequently there may be no need to use $X_{ccs,7}$ to signal modulation or rank information and the channelization code-set mapping may be defined as follows.

Given P (multi-)codes starting at code O, the information-field may be calculated using the unsigned binary representation of integers for the first three bits (code group indicator) of which $x_{ccs,1}$ is the MSB using the following equation:

$$x_{ccs,1}, x_{ccs,2}, x_{ccs,3} = \min(P-1, 15-P), \quad \text{Equation (12)}$$

The information-field may be calculated using the unsigned binary representation of integers for the last four bits (code offset indicator) of which $x_{ccs,4}$ is the most significant bit (MSB) using the following equation:

$$x_{ccs,4}, x_{ccs,5}, x_{ccs,6}, x_{ccs,7} = |O - 1 - \lfloor P/8 \rfloor * 15|. \quad \text{Equation (13)}$$

Compared with existing channelization code-set mapping algorithm, this method may not put any restrictions on the selection of P and O via HS-SCCH number as in the existing method and thus may increase the scheduling flexibility.

In Release 7 downlink MIMO, each transport block is mapped to a single layer. With the support of up to 4 layers on the downlink, a single transport block may be carried over two layers, alone or in combination with another transport block, for example, on one or two different layers.

Table 10 is a third example mapping of $X_{pwi}$, $X_{ms}$.

TABLE 10

| xpwipb, 1, xpwipb, 2 | xms, 1, xms, 2, xms, 3 | Modulation for primary transport block | Modulation for secondary transport block | Number of transport blocks |
|---|---|---|---|---|
| 00: rank 2 | 111 | 16QAM | 16QAM | 2 |
| 01: rank 3 | | | | |
| 10: rank 4 | | | | |
| 00: rank 2 | 110 | 16QAM | QPSK | 2 |
| 01: rank 3 | | | | |
| 10: rank 4 | | | | |
| If xccs, 7 = 1, then 00: rank 2 | 101 | 64QAM | Indicated by xccs, 7 | Indicated by xccs, 7 |

TABLE 10-continued

| xpwipb, 1, xpwipb, 2 | xms, 1, xms, 2, xms, 3 | Modulation for primary transport block | Modulation for secondary transport block | Number of transport blocks |
|---|---|---|---|---|
| 01: rank 3 | | | | |
| 10: rank 4 | | | | |
| Otherwise, | | | | |
| 00: rank 1 | | | | |
| 01: rank 2 | | | | |
| 00: rank 1 | 100 | 16QAM | n/a | 1 |
| 01: rank 2 | | | | |
| 00: rank 2 | 011 | QPSK | QPSK | 2 |
| 01: rank 3 | | | | |
| 10: rank 4 | | | | |
| 00: rank 2 | 010 | 64QAM | 64QAM | 2 |
| 01: rank 3 | | | | |
| 10: rank 4 | | | | |
| 00: rank 2 | 001 | 64QAM | 16QAM | 2 |
| 01: rank 3 | | | | |
| 10: rank 4 | | | | |
| 00: rank 1 | 000 | QPSK | n/a | 1 |
| 01: rank 2 | | | | |

Table 10 shows an example of alternate mapping derive from Table 8.

Table 11 is a fourth example mapping of $X_{pwi}$, $X_{ms}$.

TABLE 11

| xpwipb, 1, xpwipb, 2 | xms, 1, xms, 2, xms, 3 | Modulation for primary transport block | Modulation for secondary transport block | Number of transport blocks | rank |
|---|---|---|---|---|---|
| 00 | 111 | 16QAM | 16QAM | 2 | 2 |
| 01 | | | | | 3 |
| 10 | | | | | 4 |
| 00 | 110 | 16QAM | QPSK | 2 | 2 |
| 01 | | | | | 3 |
| 10 | | | | | 4 |
| 00 | 101 | 64QAM | QPSK | 2 | 2 |
| 01 | | | | | 3 |
| 10 | | | | | 4 |
| 11 | 101 | 64QAM | n/a | 1 | 1 |
| 00 | 100 | | | | 2 |
| 01 | 100 | 16QAM | n/a | 1 | 1 |
| 10 | | | | | 2 |
| 00 | 011 | QPSK | QPSK | 2 | 2 |
| 01 | | | | | 3 |
| 10 | | | | | 4 |
| 00 | 010 | 64QAM | 64QAM | 2 | 2 |
| 01 | | | | | 3 |
| 10 | | | | | 4 |
| 00 | 001 | 64QAM | 16QAM | 2 | 2 |
| 01 | | | | | 3 |
| 10 | | | | | 4 |
| 00 | 000 | QPSK | n/a | 1 | 1 |
| 01 | | | | | 2 |

Table 11 shows an example of alternate mapping derived from Table 9.

In another alternative, it may be assumed that transport blocks may only be carried with one or two layers, and when two transport blocks are transmitted, the Node-B may use three or four layers. With such restriction, a single bit of $X_{pwi}$ may be needed to signal the rank and the other bit may be reserved for future use. Table 12 is a fifth example mapping of $X_{pwi}$, $X_{ms}$.

TABLE 12

| xpwipb, 1 | xms, 1, xms, 2, xms, 3 | Modulation for primary transport block | Modulation for secondary transport block | Number of transport blocks |
|---|---|---|---|---|
| 0: rank 3<br>1: rank 4 | 111 | 16QAM | 16QAM | 2 |
| 0: rank 3<br>1: rank 4 | 110 | 16QAM | QPSK | 2 |
| If xccs, 7 = 1, then<br>0: rank 3<br>1: rank 4<br>Otherwise,<br>0: rank 1<br>1: rank 2 | 101 | 64QAM | Indicated by xccs, 7 | Indicated by xccs, 7 |
| 0: rank 1<br>1: rank 2 | 100 | 16QAM | n/a | 1 |
| 0: rank 3<br>1: rank 4 | 011 | QPSK | QPSK | 2 |
| 0: rank 3<br>1: rank 4 | 010 | 64QAM | 64QAM | 2 |
| 0: rank 3<br>1: rank 4 | 001 | 64QAM | 16QAM | 2 |
| 0: rank 3<br>1: rank 4 | 000 | QPSK | n/a | 1 |

Table 13 is a sixth example mapping of $X_{pwi}$, $X_{ms}$.

TABLE 13

| xpwipb, 1<br>xpwipb, 2 | xms, 1, xms, 2, xms, 3 | Modulation for primary transport block | Modulation for secondary transport block | Number of transport blocks | rank |
|---|---|---|---|---|---|
| 00<br>01 | 111 | 16QAM | 16QAM | 2 | 3<br>4 |
| 00<br>01 | 110 | 16QAM | QPSK | 2 | 3<br>4 |
| 00<br>01 | 101 | 64QAM | QPSK | 2 | 3<br>4 |
| 10<br>11 | 101 | 64QAM | n/a | 1 | 1<br>2 |
| 00<br>01 | 100 | 16QAM | n/a | 1 | 1<br>2 |
| 00<br>01 | 011 | QPSK | QPSK | 2 | 3<br>4 |
| 00<br>01 | 010 | 64QAM | 64QAM | 2 | 3<br>4 |
| 00<br>01 | 001 | 64QAM | 16QAM | 2 | 3<br>4 |
| 00<br>01 | 000 | QPSK | n/a | 1 | 1<br>2 |

Table 13 shows another example of alternate mapping derived from Table 12, whereas in Table 9 and 11, $X_{ccs,7}$ is not used for indicating the modulation format. In this example, both bits of $X_{pwi}$ may be needed. One of the bits may be used to differentiate the modulation scheme and number of transport blocks replacing the function of $X_{ccs,7}$.

For codebook-based MIMO transmission scheme, not only may the rank information need to be signaled to the WTRU, but also the precoding weight information may need to be signaled. Additional bits may be required in order to signal precoding weight information compared to Release 7 MIMO. Therefore, the HS-SCCH type 3 may not be directly reused or extended to support 4-branch DL MIMO and a new type of HS-SCCH may be designed. Without loss of generality, the new HS-SCCH channel may be named HS-SCCH type 4. HS-SCCH type 4 may be used when the WTRU is configured in 4Tx MIMO mode.

For HS-SCCH type 4 content, if one transport block is transmitted on the associated HS-PDSCH(s), the following information may be transmitted by means of the HS-SCCH type 4 physical channel.

Channelization-code-set information may be transmitted by means of the HS-SCCH type 4 physical channel using 7 bits, for example, $x_{ccs,1}$, $x_{ccs,2}$, . . . , $x_{ccs,7}$.

Modulation scheme and number of transport blocks information may be transmitted by means of the HS-SCCH type 4 physical channel using 3 bits, for example, $x_{ms,1}$, $x_{ms,2}$, $x_{ms,3}$.

Rank information may be transmitted by means of the HS-SCCH type 4 physical channel using 2 bits, for example, $x_{ri,1}$, $x_{ri,2}$. The transmission of rank information may be optional.

Precoding weight information may be transmitted by means of the HS-SCCH type 4 physical channel using 4 bits, for example, $x_{pwipb,1}$, $x_{pwipb,2}$, $x_{pwipb,3}$, $x_{pwipb,4}$.

Transport-block size information may be transmitted by means of the HS-SCCH type 4 physical channel using 6 bits, for example, $x_{tbspb,1}$, $x_{tbspb,2}$, . . . , $x_{tbspb,6}$.

Hybrid-ARQ process information may be transmitted by means of the HS-SCCH type 4 physical channel using 4 bits, for example, $x_{hap,1}$, $x_{hap,2}$, . . . , $x_{hap,4}$.

Redundancy and constellation version may be transmitted by means of the HS-SCCH type 4 physical channel using 2 bits, for example, $x_{rvpb,1}$, $x_{rvpb,2}$.

WTRU identity information may be transmitted by means of the HS-SCCH type 4 physical channel using 16 bits, for example, $x_{wtru,1}$, $x_{wtru,2}$, . . . , $x_{wtru,16}$.

For HS-SCCH type 4 content, if two transport blocks are transmitted on the associated HS-PDSCHs, the following information may transmitted by means of the HS-SCCH type 4 physical channel.

Channelization-code-set information may be transmitted by means of the HS-SCCH type 4 physical channel using 7 bits, for example, $x_{ccs,1}$, $x_{ccs,2}$, . . . , $x_{ccs,7}$.

Modulation scheme and number of transport blocks information may be transmitted by means of the HS-SCCH type 4 physical channel using 3 bits, for example, $x_{ms,1}$, $x_{ms,2}$, $x_{ms,3}$.

Rank information may be transmitted by means of the HS-SCCH type 4 physical channel using 2 bits, for example, $x_{ri,1}$, $x_{ri,2}$. Rank information may be optional.

Precoding weight information may be transmitted by means of the HS-SCCH type 4 physical channel using 4 bits, for example, $x_{pwipb,1}$, $x_{pwipb,2}$, $x_{pwipb,3}$, $x_{pwipb,4}$.

Transport-block size information for the primary transport block may be transmitted by means of the HS-SCCH type 4 physical channel using 6 bits, for example, $x_{tbspb,1}$, $x_{tbspb,2}$, . . . , $x_{tbspb,6}$.

Transport-block size information for the secondary transport block may be transmitted by means of the HS-SCCH type 4 physical channel using 6 bits, for example, $x_{tbssb,1}$, $x_{tbssb,2}$, . . . , $x_{tbssb,6}$.

Hybrid-ARQ process information may be transmitted by means of the HS-SCCH type 4 physical channel using 4 bits, for example, $x_{hap,1}$, $x_{hap,2}$, . . . , $x_{hap,4}$.

Redundancy and constellation version for the primary transport block may be transmitted by means of the HS-SCCH type 4 physical channel using 2 bits, for example, $x_{rvpb,1}$, $x_{rvpb,2}$.

Redundancy and constellation version for the secondary transport block may be transmitted by means of the HS-SCCH type 4 physical channel using 2 bits, for example, $x_{rvsb,1}$, $x_{rvsb,2}$.

WTRU identity information may be transmitted by means of the HS-SCCH type 4 physical channel using 16 bits, for example, $x_{wtru,1}, x_{wtru,2}, \ldots, x_{wtru,16}$.

In an alternate embodiment of the content, the rank information may be derived implicitly from the precoding information; therefore the rank information becomes optional depending on the implementation. In such cases, the precoding information may consist of an index to a precolling matrix which is pre-configured with a fixed number of layers.

Figure 20:
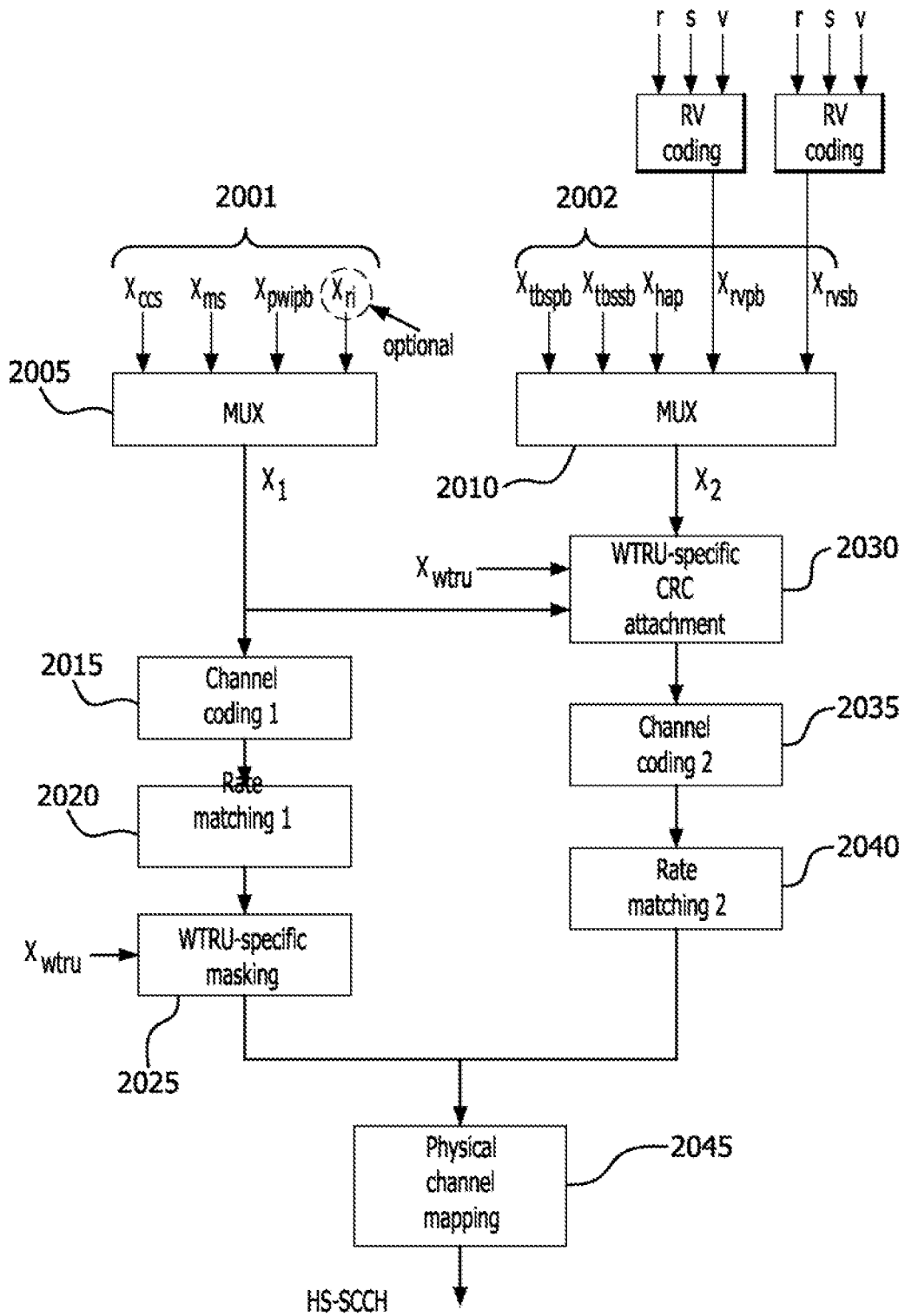
FIG. 20 is an example of the coding chain for HS-SCCH type 4.

FIG. 20 is an example of the coding chain for HS-SCCH type 4. FIG. 20 includes a first multiplexer 2005 and a second multiplexer 2010. Channelization code set information, modulation scheme and transport block information, rank information, and precolling weight information 2001 may be put into a first multiplexer 2005. The inclusion of rank information may be optional. The output of the first multiplexer 2005 may then be channel coded using a first channel coding 2015. The output of the first channel coding 2015 may then be rate matched using a first rate matching 1 2020. The output of the first rate matching 2020 may then be masked with WTRU-specific masking 2025. WTRU identity information may be included in the WTRU-specific masking 2025.

Transport-block size information for the primary transport block, transport-block size information for the secondary transport block, Hybrid-ARQ process information, redundancy and constellation version for the primary transport block, and redundancy and constellation version for the secondary transport block 2002 may be input to a second multiplexer 2010. The output of the second multiplexer 2010 may receive WTRU-specific CRC attachment 2030. WTRU identity information may be included the WTRU-specific CRC attachment 2030. The output may then be channel coded using a second channel coding 2035. The output of the second channel coding 2035 may then be rate matched using a second rate matching 2040. The output of the second rate matching 2040 may then be combined with the WTRU-specific masking 2025 output for physical channel mapping 2045.

For signaling downlink control information for a maximum of 4 codewords, the Node-B may need to signal the transport block size and redundancy and constellation version for each codeword.

For a non-codebook-based MIMO scheme, there may be no need to signal precoding weight information. If one transport block is transmitted on the associated HS-PDSCH(s), the following information may be transmitted by means of the HS-SCCH physical channel.

Channelization-code-set information may be transmitted by means of the HS-SCCH physical channel using 7 bits, for example, $x_{ccs,1}, x_{ccs,2}, \ldots, x_{ccs,7}$.

Modulation scheme and number of transport blocks information may be transmitted by means of the HS-SCCH physical channel using 3 bits, for example, $x_{ms,1}, x_{ms,2}, x_{ms,3}$.

Rank information may be transmitted by means of the HS-SCCH physical channel using 2 bits, for example, $x_{ri,1}, x_{ri,2}$.

Transport-block size information may be transmitted by means of the HS-SCCH physical channel using 6 bits, for example, $x_{tbspb,1}, x_{tbspb,2}, \ldots, x_{tbspb,6}$.

Hybrid-ARQ process information may be transmitted by means of the HS-SCCH physical channel using 4 bits, for example, $x_{hap,1}, x_{hap,2}, \ldots, x_{hap,4}$.

Redundancy and constellation version may be transmitted by means of the HS-SCCH physical channel using 2 bits, for example, $x_{rvpb,1}, x_{rvpb,2}$.

WTRU identity information may be transmitted by means of the HS-SCCH physical channel using 16 bits, for example, $x_{wtru,1}, x_{wtru,2}, \ldots, x_{wtru,16}$.

If two transport blocks are transmitted on the associated HS-PDSCHs, the following information may be transmitted by means of the HS-SCCH physical channel.

Channelization-code-set information may be transmitted by means of the HS-SCCH physical channel using 7 bits, for example, $x_{ccs,1}, x_{ccs,2}, \ldots, x_{ccs,7}$.

Modulation scheme and number of transport blocks information may be transmitted by means of the HS-SCCH physical channel using 3 bits, for example, $x_{ms,1}, x_{ms,2}, x_{ms,3}$.

Rank information may be transmitted by means of the HS-SCCH physical channel using 2 bits, for example, $x_{ri,1}, x_{ri,2}$.

Transport-block size information for the primary transport block may be transmitted by means of the HS-SCCH physical channel using 6 bits, for example, $x_{tbspb,1}, x_{tbspb,2}, \ldots, x_{tbspb,6}$.

Transport-block size information for the secondary transport block may be transmitted by means of the HS-SCCH physical channel using 6 bits, for example, $x_{tbssb,1}, x_{tbssb,2}, \ldots, x_{tbssb,6}$.

Hybrid-ARQ process information may be transmitted by means of the HS-SCCH physical channel using 4 bits, for example, $x_{hap,1}, x_{hap,2}, \ldots, x_{hap,4}$.

Redundancy and constellation version for the primary transport block may be transmitted by means of the HS-SCCH physical channel using 2 bits, for example, $x_{rvpb,1}, x_{rvpb,2}$.

Redundancy and constellation version for the secondary transport block may be transmitted by means of the HS-SCCH physical channel using 2 bits, $x_{rvsb,1}, x_{rvsb,2}$.

WTRU identity information may be transmitted by means of the HS-SCCH physical channel using 16 bits, for example, $x_{wtru,1}, x_{wtru,2}, \ldots, x_{wtru,16}$.

If three transport blocks are transmitted on the associated HS-PDSCHs, the following information may be transmitted by means of the HS-SCCH physical channel.

Channelization-code-set information may be transmitted by means of the HS-SCCH physical channel using 7 bits, for example, $x_{ccs,1}, x_{ccs,2}, \ldots, x_{ccs,7}$.

Modulation scheme and number of transport blocks information may be transmitted by means of the HS-SCCH physical channel using 3 bits, for example, $x_{ms,1}, x_{ms,2}, x_{ms,3}$.

Rank information may be transmitted by means of the HS-SCCH physical channel using 2 bits, for example, $x_{ri,1}, x_{ri,2}$.

Transport-block size information for the primary transport block may be transmitted by means of the HS-SCCH physical channel using 6 bits, for example, $x_{tbspb,1}, x_{tbspb,2}, \ldots, x_{tbspb,6}$.

Transport-block size information for the secondary transport block may be transmitted by means of the HS-SCCH physical channel using 6 bits, for example, $x_{tbssb,1}, x_{tbssb,2}, \ldots, x_{tbssb,6}$.

Transport-block size information for the third transport block may be transmitted by means of the HS-SCCH physical channel using 6 bits, for example, $x_{tbs3,1}, x_{tbs3,2}, \ldots, x_{tbs3,6}$.

Hybrid-ARQ process information may be transmitted by means of the HS-SCCH physical channel using 4 bits, for example, $x_{hap,1}, x_{hap,2}, \ldots, x_{hap,4}$.

Redundancy and constellation version for the primary transport block may be transmitted by means of the HS-SCCH physical channel using 2 bits, for example, $x_{rvpb,1}, x_{rvpb,2}$.

Redundancy and constellation version for the secondary transport block may be transmitted by means of the HS-SCCH physical channel using 2 bits, for example, $x_{rvsb,1}$, $x_{rvsb,2}$.

Redundancy and constellation version for the third transport block may be transmitted by means of the HS-SCCH physical channel using 2 bits, for example, $x_{rv3,1}$, $x_{rv3,2}$.

WTRU identity information may be transmitted by means of the HS-SCCH physical channel using 16 bits, for example, $x_{wtru,1}$, $x_{wtru,2}$, . . . , $x_{wtru,16}$.

If four transport blocks are transmitted on the associated HS-PDSCHs, the following information is transmitted by means of the HS-SCCH physical channel:

Channelization-code-set information may be transmitted by means of the HS-SCCH physical channel using 7 bits, for example, $x_{ccs,1}$, $x_{ccs,2}$, . . . , $x_{ccs,7}$.

Modulation scheme and number of transport blocks information may be transmitted by means of the HS-SCCH physical channel using 3 bits, for example, $x_{ms,1}$, $x_{ms,2}$, $x_{ms,3}$.

Rank information may be transmitted by means of the HS-SCCH physical channel using 2 bits, for example, $x_{ri,1}$, $x_{ri,2}$.

Transport-block size information for the primary transport block may be transmitted by means of the HS-SCCH physical channel using 6 bits, for example, $x_{tbspb,1}$, $x_{tbspb,2}$, . . . , $x_{tbspb,6}$.

Transport-block size information for the secondary transport block may be transmitted by means of the HS-SCCH physical channel using 6 bits, for example, $x_{tbssb,1}$, $x_{tbssb,2}$, . . . , $x_{tbssb,6}$.

Transport-block size information for the third transport block may be transmitted by means of the HS-SCCH physical channel using 6 bits, for example, $x_{tbs3,1}$, $x_{tbs3,2}$, . . . , $x_{tbs3,6}$.

Hybrid-ARQ process information may be transmitted by means of the HS-SCCH physical channel using 4 bits, for example, $x_{hap,1}$, $x_{hap,2}$, . . . , $x_{hap,4}$.

Redundancy and constellation version for the primary transport block may be transmitted by means of the HS-SCCH physical channel using 2 bits, for example, $x_{rvpb,1}$, $x_{rvpb,2}$.

Redundancy and constellation version for the secondary transport block may be transmitted by means of the HS-SCCH physical channel using 2 bits, for example, $x_{rvsb,1}$, $x_{rvsb,2}$.

Redundancy and constellation version for the third transport block may be transmitted by means of the HS-SCCH physical channel using 2 bits, for example, $x_{rv3,1}$, $x_{rv3,2}$.

Redundancy and constellation version for the fourth transport block may be transmitted by means of the HS-SCCH physical channel using 2 bits, for example, $x_{rv4,1}$, $x_{rv4,2}$.

WTRU identity information may be transmitted by means of the HS-SCCH physical channel using 16 bits, for example, $x_{wtru,1}$, $x_{wtru,2}$, . . . , $x_{wtru,16}$.

Table 14 is an example mapping of bits $X_{ri}$, $X_{ms}$.

TABLE 14

| xms,1, xms,2, xms,3 | xri,1, xri,2 | Modulation for primary transport block | Modulation for secondary transport block | Modulation for third transport block | Modulation for fourth transport block | Number of transport blocks |
|---|---|---|---|---|---|---|
| 111 | 11 | 64QAM | 64QAM | 64QAM | 64QAM | 4 |
| 110 | 11 | 64QAM | 64QAM | 64QAM | 16QAM | 4 |
| 101 | 11 | 64QAM | 64QAM | 64QAM | QPSK | 4 |

TABLE 14-continued

| xms,1, xms,2, xms,3 | xri,1, xri,2 | Modulation for primary transport block | Modulation for secondary transport block | Modulation for third transport block | Modulation for fourth transport block | Number of transport blocks |
|---|---|---|---|---|---|---|
| 100 | 11 | 64QAM | 64QAM | 16QAM | 16QAM | 4 |
| 011 | 11 | 64QAM | 64QAM | 16QAM | QPSK | 4 |
| 001 | 11 | 64QAM | 64QAM | QPSK | QPSK | 4 |
| 000 | 11 | 64QAM | 16QAM | 16QAM | 16QAM | 4 |
| 010 | 11 | 64QAM | 16QAM | 16QAM | QPSK | 4 |
| 010 | 10 | 64QAM | 16QAM | QPSK | QPSK | 4 |
| 101 | 10 | 64QAM | QPSK | QPSK | QPSK | 4 |
| 111 | 10 | 16QAM | 16QAM | 16QAM | 16QAM | 4 |
| 110 | 10 | 16QAM | 16QAM | 16QAM | QPSK | 4 |
| 011 | 10 | 16QAM | 16QAM | QPSK | QPSK | 4 |
| 001 | 10 | 16QAM | QPSK | QPSK | QPSK | 4 |
| 100 | 10 | QPSK | QPSK | QPSK | QPSK | 4 |
| 000 | 10 | 64QAM | 64QAM | 64QAM | n/a | 3 |
| 010 | 01 | 64QAM | 64QAM | 16QAM | n/a | 3 |
| 101, xccs,7 = 1 | 01 | 64QAM | 64QAM | QPSK | n/a | 3 |
| 101, xccs,7 = 0 | 01 | 64QAM | 16QAM | 16QAM | n/a | 3 |
| 111 | 01 | 64QAM | 16QAM | QPSK | n/a | 3 |
| 110 | 01 | 64QAM | QPSK | QPSK | n/a | 3 |
| 011 | 01 | 16QAM | 16QAM | 16QAM | n/a | 3 |
| 001 | 01 | 16QAM | 16QAM | QPSK | n/a | 3 |
| 100 | 01 | 16QAM | QPSK | QPSK | n/a | 3 |
| 000 | 01 | QPSK | QPSK | QPSK | n/a | 3 |
| 010 | 00 | 64QAM | 64QAM | n/a | n/a | 2 |
| 001 | 00 | 64QAM | 16QAM | n/a | n/a | 2 |
| 101, xccs,7 = 0 | 00 | 64QAM | QPSK | n/a | n/a | 2 |
| 111 | 00 | 16QAM | 16QAM | n/a | n/a | 2 |
| 110 | 00 | 16QAM | QPSK | n/a | n/a | 2 |
| 011 | 00 | QPSK | QPSK | n/a | n/a | 2 |
| 101, xccs,7 = 1 | 00 | 64QAM | n/a | n/a | n/a | 1 |
| 100 | 00 | 16QAM | n/a | n/a | n/a | 1 |
| 000 | 00 | QPSK | n/a | n/a | n/a | 1 |

As there are 34 different combinations of modulation type and number of transport blocks illustrated in Table 14, the coding of 9 different combinations of modulation type and number of transport blocks defined in Release 7 MIMO may be used as the base line. The introduction of 2 additional bits xri,1 and xri,2, may provide a total of 36 different combinations to signal the modulation type and number of transport blocks for 4-Tx MIMO. One example of using xms and xri to indicate WTRUs such control information is shown in Table 14. For rank 4 transmission, there may be no need to use $x_{ccs,7}$ to indicate the modulation type.

Figure 21:
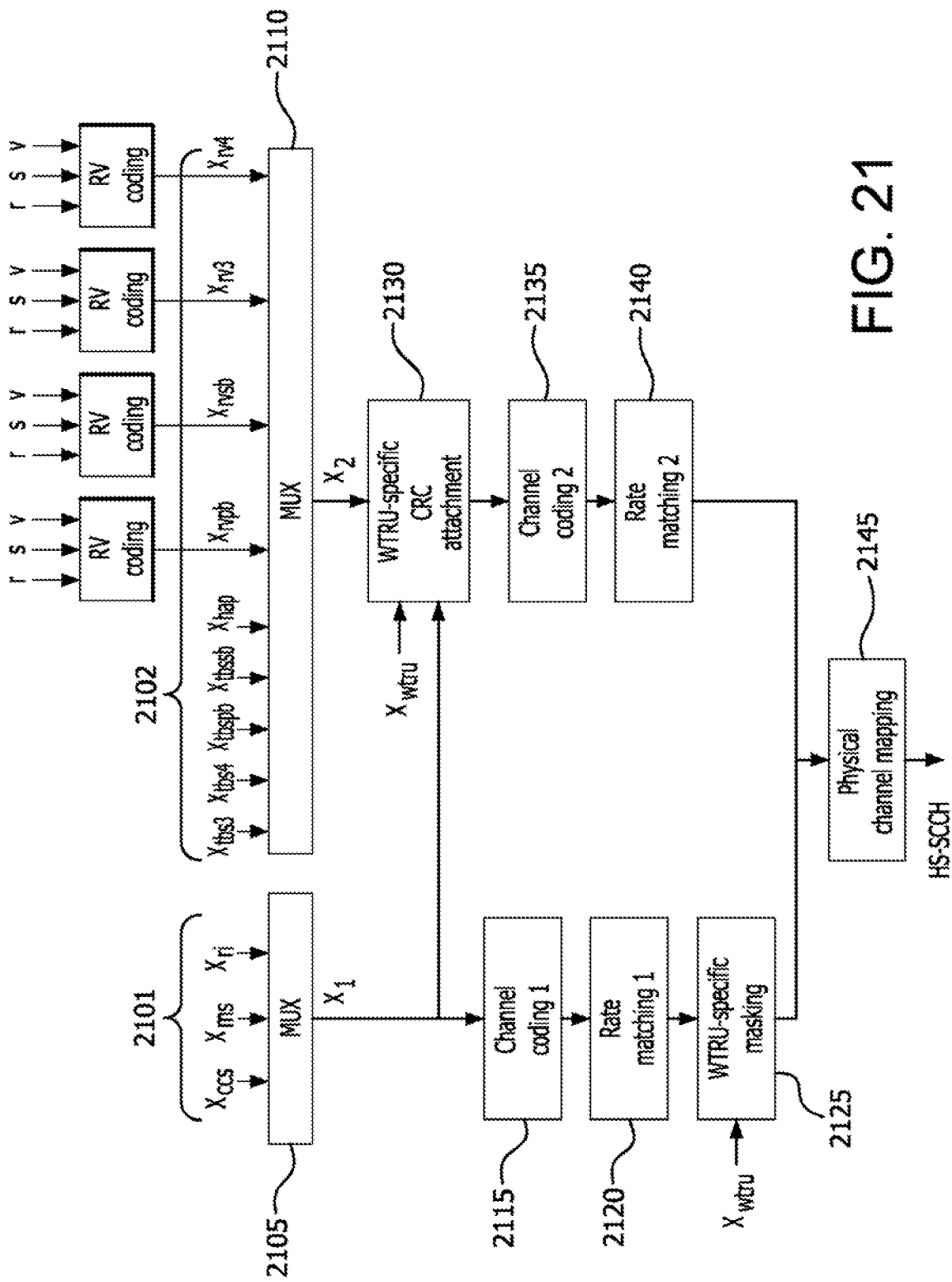
FIG. 21 is an example of a coding chain for HS-SCCH for a non-codebook based MIMO scheme with 4 transport blocks.

FIG. 21 is an example of a coding chain for HS-SCCH for a non-codebook based MIMO scheme with 4 transport blocks. FIG. 21 includes a first multiplexer 2105 and a second multiplexer 2110. Channelization code set information, modulation scheme and transport block information, and rank information 2101 may be put into a first multiplexer 2105. The output of the first multiplexer 2105 may then be channel coded using a first channel coding 2115. The output of the first channel coding 2115 may then be rate matched using a first rate matching 2120. The output of the first rate matching 2120 may then be masked with WTRU-specific masking 2125. WTRU identity information may be included in the WTRU-specific masking 2125.

Transport-block size information for the primary transport block, transport-block size information for the secondary transport block, transport-block size information for the third transport block, transport-block size information for the fourth transport block, Hybrid-ARQ process information, redundancy and constellation version for the primary transport block, redundancy and constellation version for the secondary transport block, redundancy and constellation version for the third transport block, and redundancy and constellation version for the fourth transport block 2102 may be put into a second multiplexer 2110. The output of the second multiplexer 2110 may receive WTRU-specific CRC attachment 2130. WTRU identity information may be included the WTRU-specific CRC attachment 2130. The output may then be channel coded using a second channel coding 2135. The output of the second channel coding 2135 may then be rate matched using a second rate matching 2140. The output of the second rate matching 2140 may then be combined with the WTRU-specific masking 2125 output for physical channel mapping 2145.

The indication of modulation type and number of transport blocks may use the method described in a non-codebook-based scheme, as shown in Table 14. However, the precoding weight information may need to be signaled in this case as well.

If one transport block is transmitted on the associated HS-PDSCH(s) is transmitted, the following information may be transmitted by means of the HS-SCCH physical channel:

Channelization-code-set information may be transmitted by means of the HS-SCCH physical channel using 7 bits, for example, $x_{ccs,1}, x_{ccs,2}, \ldots, x_{ccs,7}$.

Modulation scheme and number of transport blocks information may be transmitted by means of the HS-SCCH physical channel using 3 bits, for example, $x_{ms,1}, x_{ms,2}, x_{ms,3}$.

Rank information may be transmitted by means of the HS-SCCH physical channel using 2 bits, for example, $x_{ri,1}, x_{ri,2}$. The transmission of the rank information may be optional.

Precoding weight information may be transmitted by means of the HS-SCCH physical channel using 4 bits, for example, $x_{pwipb,1}, x_{pwipb,2}, x_{pwipb,3}, x_{pwipb,4}$.

Transport-block size information, may be transmitted by means of the HS-SCCH physical channel using 6 bits, for example, $x_{tbspb,1}, x_{tbspb,2}, \ldots, x_{tbspb,6}$.

Hybrid-ARQ process information may be transmitted by means of the HS-SCCH physical channel using 4 bits, for example, $x_{hap,1}, x_{hap,2}, \ldots, x_{hap,4}$.

Redundancy and constellation version may be transmitted by means of the HS-SCCH physical channel using 2 bits, for example, $x_{rvpb,1}, x_{rvpb}$.

WTRU identity information may be transmitted by means of the HS-SCCH physical channel using 16 bits, for example, $x_{wtru,1}, x_{wtru,2}, \ldots, x_{wtru,16}$.

If two transport blocks are transmitted on the associated HS-PDSCHs, the following information may be transmitted by means of the HS-SCCH physical channel:

Channelization-code-set information may be transmitted by means of the HS-SCCH physical channel using 7 bits, for example, $x_{ccs,1}, x_{ccs,2}, \ldots, x_{ccs,7}$.

Modulation scheme and number of transport blocks information may be transmitted by means of the HS-SCCH physical channel using 3 bits, for example, $x_{ms,1}, x_{ms,2}, x_{ms,3}$.

Rank information may be transmitted by means of the HS-SCCH physical channel using 2 bits, for example, $x_{ri,1}, x_{ri,2}$. The transmission of the rank information may be optional.

Precoding weight information may be transmitted by means of the HS-SCCH physical channel using 4 bits, for example, $x_{pwipb,1}, x_{pwipb,2}, x_{pwipb,3}, x_{pwipb,4}$.

Transport-block size information, may be transmitted by means of the HS-SCCH physical channel using 6 bits, for example, $x_{tbspb,1}, x_{tbspb,2}, \ldots, x_{tbspb,6}$.

Hybrid-ARQ process information may be transmitted by means of the HS-SCCH physical channel using 4 bits, for example, $x_{hap,1}, x_{hap,2}, \ldots, x_{hap,4}$.

Redundancy and constellation version may be transmitted by means of the HS-SCCH physical channel using 2 bits, for example, $x_{rvpb,1}, x_{rvpb}$.

Redundancy and constellation version for the secondary transport block may be transmitted by means of the HS-SCCH physical channel using 2 bits, for example, $x_{rvsb,1}, x_{rvsb,2}$.

WTRU identity information may be transmitted by means of the HS-SCCH physical channel using 16 bits, for example, $x_{wtru,1}, x_{wtru,2}, \ldots, x_{wtru,16}$.

If three transport blocks are transmitted on the associated HS-PDSCHs, the following information may be transmitted by means of the HS-SCCH physical channel:

Channelization-code-set information may be transmitted by means of the HS-SCCH physical channel using 7 bits, for example, $x_{ccs,1}, x_{ccs,2}, \ldots, x_{ccs,7}$.

Modulation scheme and number of transport blocks information may be transmitted by means of the HS-SCCH physical channel using 3 bits, for example, $x_{ms,1}, x_{ms,2}, x_{ms,3}$.

Rank information may be transmitted by means of the HS-SCCH physical channel using 2 bits, for example, $x_{ri,1}, x_{ri,2}$. The transmission of the rank information may be optional.

Precoding weight information may be transmitted by means of the HS-SCCH physical channel using 4 bits, for example, $x_{pwipb,1}, x_{pwipb,2}, x_{pwipb,3}, x_{pwipb,4}$.

Transport-block size information, may be transmitted by means of the HS-SCCH physical channel using 6 bits, for example, $x_{tbspb,1}, x_{tbspb,2}, \ldots, x_{tbspb,6}$.

Hybrid-ARQ process information may be transmitted by means of the HS-SCCH physical channel using 4 bits, for example, $x_{hap,1}, x_{hap,2}, \ldots, x_{hap,4}$.

Redundancy and constellation version may be transmitted by means of the HS-SCCH physical channel using 2 bits, for example, $x_{rvpb,1}, x_{rvpb}$.

Redundancy and constellation version for the secondary transport block may be transmitted by means of the HS-SCCH physical channel using 2 bits, for example, $x_{rvsb,1}, x_{rvsb,2}$.

Redundancy and constellation version for the third transport block may be transmitted by means of the HS-SCCH physical channel using 2 bits, for example, $x_{rv3,1}, x_{rv3,2}$.

WTRU identity information may be transmitted by means of the HS-SCCH physical channel using 16 bits, for example, $x_{wtru,1}, x_{wtru,2}, \ldots, x_{wtru,16}$.

If four transport blocks are transmitted on the associated HS-PDSCHs, the following information may be transmitted by means of the HS-SCCH physical channel:

Channelization-code-set information may be transmitted by means of the HS-SCCH physical channel using 7 bits, for example, $x_{ccs,1}, x_{ccs,2}, \ldots, x_{ccs,7}$.

Modulation scheme and number of transport blocks information may be transmitted by means of the HS-SCCH physical channel using 3 bits, for example, $x_{ms,1}, x_{ms,2}, x_{ms,3}$.

Rank information may be transmitted by means of the HS-SCCH physical channel using 2 bits, for example, $x_{ri,1}, x_{ri,2}$. The transmission of the rank information may be optional.

Precoding weight information may be transmitted by means of the HS-SCCH physical channel using 4 bits, for example, $x_{pwipb,1}, x_{pwipb,2}, x_{pwipb,3}, x_{pwipb,4}$.

Transport-block size information, may be transmitted by means of the HS-SCCH physical channel using 6 bits, for example, $x_{tbspb,1}, x_{tbspb,2}, \ldots, x_{tbspb,6}$.

Hybrid-ARQ process information may be transmitted by means of the HS-SCCH physical channel using 4 bits, for example, $x_{hap,1}, x_{hap,2}, \ldots, x_{hap,4}$.

Redundancy and constellation version may be transmitted by means of the HS-SCCH physical channel using 2 bits, for example, $x_{rvpb,1}, x_{rvpb}$.

Redundancy and constellation version for the secondary transport block may be transmitted by means of the HS-SCCH physical channel using 2 bits, for example, $x_{rvsb,1}, x_{rvsb,2}$.

Redundancy and constellation version for the third transport block may be transmitted by means of the HS-SCCH physical channel using 2 bits, for example, $x_{rv3,1}, x_{rv3,2}$.

Redundancy and constellation version for the fourth transport block may be transmitted by means of the HS-SCCH physical channel using 2 bits, for example, $x_{rv4,1}, x_{rv4,2}$.

WTRU identity information may be transmitted by means of the HS-SCCH physical channel using 16 bits, for example, $x_{wtru,1}, x_{wtru,2}, \ldots, x_{wtru,16}$.

Figure 22:
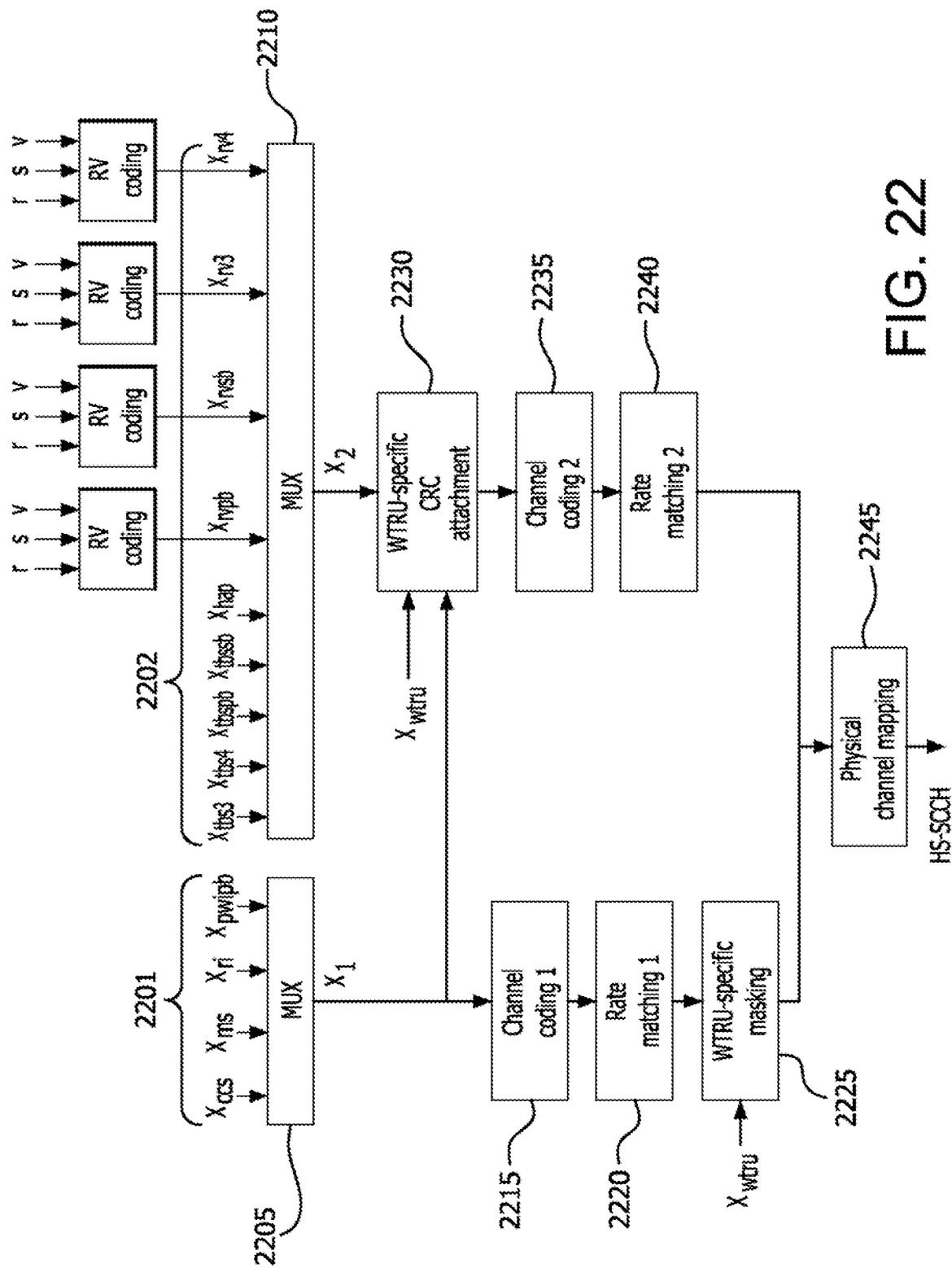
FIG. 22 is an example of a coding chain for HS-SCCH for a codebook based MIMO scheme with 4 transport blocks.

FIG. 22 is an example of a coding chain for HS-SCCH for a codebook based MIMO scheme with 4 transport blocks. FIG. 22 includes a first multiplexer 2205 and a second multiplexer 2210. Channelization code set information, modulation scheme and transport block information, rank information, and precoding weight information 2201 may be put into a first multiplexer 2205. The output of the first multiplexer 2205 may then be channel coded using a first channel coding 2215. The output of the first channel coding 2215 may then be rate matched using a first rate matching 2220. The output of the first rate matching 2220 may then be masked with WTRU-specific masking 2225. WTRU identity information may be included in the WTRU-specific masking 2225.

Transport-block size information for the primary transport block, transport-block size information for the secondary transport block, transport-block size information for the third transport block, transport-block size information for the fourth transport block, Hybrid-ARQ process information, redundancy and constellation version for the primary transport block, redundancy and constellation version for the secondary transport block, redundancy and constellation version for the third transport block, and redundancy and constellation version for the fourth transport block 2202 may be put into a second multiplexer 2210. The output of the second multiplexer 2210 may receive WTRU-specific CRC attachment 2230. WTRU identity information may be included the WTRU-specific CRC attachment 2230. The output may then be channel coded using a second channel coding 2235. The output of the second channel coding 2235 may then be rate matched using a second rate matching 2240. The output of the second rate matching 2240 may then be combined with the WTRU-specific masking 2225 output for physical channel mapping 2245.

The rank indication may also be carried out implicitly based on the precoding weight information. Therefore the rank indication field may be optional. The size of the fields is given as an example and the concepts put forth herein may also be extended to different number of bits for each field where applicable.

Figure 23:
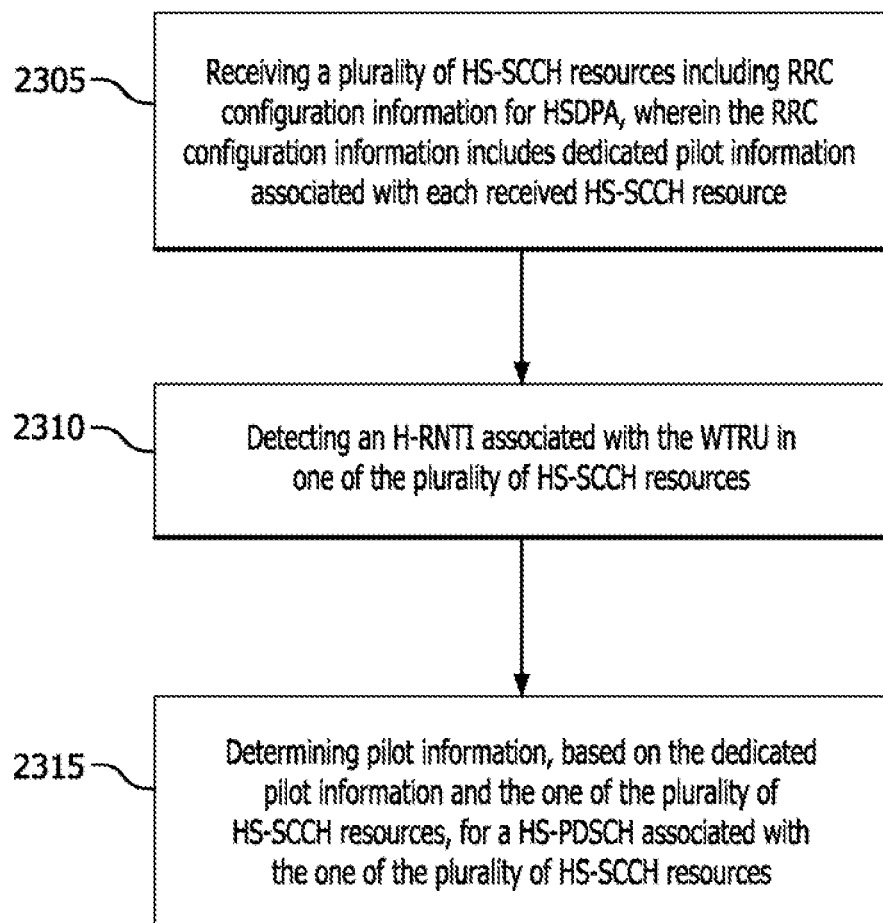
FIG. 23 is an example of a method for determining pilot information for each data stream.

FIG. 23 is an example of a method for determining pilot information for each data stream. FIG. 23 illustrates that a WTRU may receive a plurality of HS-SCCH resources including RRC configuration information for HSDPA, wherein the RRC configuration information includes dedicated pilot information associated with each received HS-SCCH resource 2305. The WTRU may detect an H-RNTI associated with the WTRU in one of the plurality of HS-SCCH resources 2310. The WTRU may then determine pilot information, based on the dedicated pilot information and the one of the plurality of HS-SCCH resources, for a high speed physically downlink shared channel (HS-PDSCH) associated with the one of the plurality of HS-SCCH resources 2315. The dedicated pilot information may be either a channelization code or a base pilot resource index.

With availability of various types of pilot channel defined, the WTRU may perform different measures to assist the network schedulers in making decision for the best transmission mode, or for the best transmission point to receiver data. These measurements may include combined CQIs from all transmission points. The measurements may be measured by the aid of the pilot channel commonly transmitted from all the involved transmission points, an individual CQI for each transmission point by exploring the cell-specific pilot channels, optimal cross-cell precoding weights, if any of the cross-site precoding schemes are configured, and rank indication information if multiflow aggregation or MU-MIMO transmission modes are to be configured. Although the WTRU may take any one or a combination of the above measurements simultaneously by monitoring the pilot channels, reporting the measurements to the network may result in overhead on the uplink feedback. Methods for reducing the overhead during WTRU reporting may include any one or combination of the methods described below.

In a first embodiment, the WTRU compares the individual CQIs from each transmission point and feedback via layer 1 (L1) and determine the CQI that indicates which one cell the WTRU is associated with.

In a second embodiment, the WTRU reports all of the measured CQIs via L1 signaling. The WTRU may report one type of CQI (e.g. the combined CQI) in full precision and the other types of CQI in a differential manner with less precision.

In a third embodiment, the WTRU reports the CQI needed for a transmission mode using L1 signaling. The WTRU may transmit other measurements via a higher layer at a much slower update rate.

In a forth embodiment, the WTRU reports signal quality at higher layer and semi-dynamically reconfigures which transmission point to use. The WTRU may report only the CQIs for that transmission point using L1 signaling, at each configuration.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A wireless transmit/receive unit (WTRU) comprising:

a receiver; and a processor;

wherein:

the receiver is configured to receive a signal of a physical control channel, the signal including an indication of a number of transport blocks and an indication of an index;

the processor is configured to determine, based on the indication of the index, a number of layers for a physical downlink shared channel and a pilot sequence for at least one of the layers; and the receiver and the processor are configured to receive and process a transmission of the physical downlink shared channel based on the indication of the number of transport blocks, the determined number of layers for the physical downlink shared channel, and the determined pilot sequence for the at least one of the layers.

2. The WTRU of claim 1, wherein the signal of the physical control channel is received as a pre-coded signal and the determined pilot sequence has a same pre-coding as the physical control channel.

3. The WTRU of claim 1, wherein the receiver is further configured to receive a radio resource control (RRC) message having configuration information for another pilot sequence for a different physical control channel and wherein the WTRU monitors the different physical control channel using a pilot signal based on the another pilot sequence.

4. A method performed by a wireless transmit/receive unit (WTRU), the method comprising:

receiving a signal of a physical control channel, the signal including an indication of a number of transport blocks and an indication of an index;

determining, based on the indication of the index, a number of layers for a physical downlink shared channel and a pilot sequence for at least one of the layers; and receiving and processing a transmission of the physical downlink shared channel based on the indication of the number of transport blocks, the determined number of layers for the physical downlink shared channel, and the determined pilot sequence for the at least one of the layers.

5. The method of claim 4, wherein the signal of the physical control channel is received as a pre-coded signal and the determined pilot sequence has a same pre-coding as the physical control channel.

6. The method of claim 4 further comprising receiving a radio resource control (RRC) message having configuration information for another pilot sequence for a different physical control channel and monitoring the different physical control channel using a pilot signal based on the another pilot sequence.

7. The WTRU of claim 1, wherein the receiver and the processor are further configured to receive and process the at least one of the layers using a pilot of the at least one of the layers, and wherein the pilot is based on the determined pilot sequence.

8. The WTRU of claim 1, wherein the pilot sequence for each layer is based on the number of layers for the physical downlink shared channel.

9. The method of claim 4, further comprising receiving and processing the at least one of the layers using a pilot of the at least one of the layers, and wherein the pilot is based on the determined pilot sequence.

10. The method of claim 4, wherein the pilot sequence for each layer is based on the number of layers for the physical downlink shared channel.

* * * * *